US011924490B2

(12) United States Patent
Nonnenmacher et al.

(10) Patent No.: US 11,924,490 B2
(45) Date of Patent: *Mar. 5, 2024

(54) SYSTEMS AND METHODS FOR ADAPTING CONTENT ITEMS TO SECURED ENDPOINT MEDIA DEVICE DATA

(71) Applicant: DISH Network L.L.C., Englewood, CO (US)

(72) Inventors: Jorg Nonnenmacher, Plascassier (FR); Robert Drew Major, Orem, UT (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,146

(22) Filed: Jan. 4, 2022

(65) Prior Publication Data

US 2022/0124396 A1    Apr. 21, 2022

Related U.S. Application Data

(63) Continuation of application No. 16/748,567, filed on Jan. 21, 2020, now Pat. No. 11,245,946.

(51) Int. Cl.
*H04N 21/266* (2011.01)
*H04L 9/06* (2006.01)
(Continued)

(52) U.S. Cl.
CPC ......... *H04N 21/266* (2013.01); *H04L 9/0637* (2013.01); *H04L 9/3213* (2013.01);
(Continued)

(58) Field of Classification Search
CPC ........... H04N 21/266; H04N 21/23605; H04N 21/64; H04N 21/23895; H04N 21/4343; H04L 9/3213; H04L 9/0637
See application file for complete search history.

(56) References Cited

U.S. PATENT DOCUMENTS 5,559,549 A    9/1996  Hendricks et al.
5,754,651 A    5/1998  Blatter et al.
(Continued)

OTHER PUBLICATIONS

European Search Report for EP 20154863.3 dated Jun. 19, 2020, all pages.

*Primary Examiner* — Yassin Alata
(74) *Attorney, Agent, or Firm* — Kilpatrick Townsend & Stockton LLP

(57) ABSTRACT

Methods, systems, and machine-readable media for adapting content composites to device operations of an endpoint media device are disclosed. Blockchain data associated with a blockchain address may be processed by one or more processing devices. The blockchain data and/or the blockchain address may be mapped by the one or more processing devices to a first endpoint media device. Based at least in part on the blockchain data, a first content composite may be identified by one or more processing devices for delivery from a content provider system via one or more networks to the first endpoint media device. Transmission of the first content composite may be caused where, consequent to delivery of the first content composite to the first endpoint media device, the first endpoint media device or a second endpoint media device performs at least one operation relating to the first content composite.

20 Claims, 5 Drawing Sheets

(51) Int. Cl.
 *H04L 9/32* (2006.01)
 *H04N 21/236* (2011.01)
 *H04N 21/2389* (2011.01)
 *H04N 21/434* (2011.01)
 *H04N 21/64* (2011.01)
 *H04L 9/00* (2022.01)

(52) U.S. Cl.
 CPC . *H04N 21/23605* (2013.01); *H04N 21/23895* (2013.01); *H04N 21/4343* (2013.01); *H04N 21/64* (2013.01); *H04L 9/50* (2022.05)

(56) References Cited

U.S. PATENT DOCUMENTS

| | | | |
|---|---|---|---|
| 6,219,358 B1 | 4/2001 | Pinder et al. |
| 6,240,555 B1 | 5/2001 | Shoff et al. |
| 6,453,304 B1 | 9/2002 | Manabu et al. |
| 7,079,176 B1 | 7/2006 | Freeman et al. |
| 7,242,406 B2 | 7/2007 | Robotham et al. |
| 8,046,798 B1 | 10/2011 | Schlack et al. |
| 8,190,674 B2 | 5/2012 | Narayanan et al. |
| 8,355,450 B1 | 1/2013 | Eshet et al. |
| 8,667,527 B2 | 3/2014 | Yan et al. |
| 8,855,681 B1 | 10/2014 | George et al. |
| 8,918,636 B2 | 12/2014 | Kiefer et al. |
| 9,104,661 B1 | 8/2015 | Evans |
| 9,225,939 B1 | 12/2015 | Kidd |
| 9,794,632 B1 | 10/2017 | Matias |
| 9,848,228 B1 | 12/2017 | Morris et al. |
| 9,848,249 B2 | 12/2017 | Freed et al. |
| 9,918,134 B2 | 3/2018 | O'Hanlon |
| 9,948,966 B1 | 4/2018 | Panchaksharaiah et al. |
| 10,368,110 B1 | 7/2019 | Verbist et al. |
| 10,771,523 B1 | 9/2020 | Carney Landow |
| 10,880,351 B1 | 12/2020 | Estus et al. |
| 10,951,958 B1 | 3/2021 | Arana et al. |
| 10,970,843 B1 | 4/2021 | Olsen et al. |
| 11,012,737 B1 | 5/2021 | Carney Landow |
| 11,303,943 B2 | 4/2022 | Carney Landow |
| 2002/0090198 A1 | 7/2002 | Rosenberg et al. |
| 2003/0105637 A1 | 6/2003 | Rodriguez et al. |
| 2006/0089870 A1 | 4/2006 | Myhr |
| 2007/0172196 A1 | 7/2007 | Kusunoki et al. |
| 2007/0263860 A1 | 11/2007 | Buchen et al. |
| 2007/0300265 A1 | 12/2007 | Karkkainen et al. |
| 2008/0109307 A1 | 5/2008 | Ullah |
| 2008/0195457 A1 | 8/2008 | Sherman et al. |
| 2008/0300982 A1 | 12/2008 | Larson et al. |
| 2008/0301732 A1 | 12/2008 | Archer et al. |
| 2008/0316358 A1 | 12/2008 | Beadle et al. |
| 2009/0044217 A1 | 2/2009 | Lutterbach et al. |
| 2009/0083631 A1 | 3/2009 | Sidi et al. |
| 2009/0193126 A1 | 7/2009 | Agarwal et al. |
| 2010/0023963 A1 | 1/2010 | Crookes et al. |
| 2010/0153983 A1 | 6/2010 | Philmon et al. |
| 2010/0179867 A1 | 7/2010 | Hughes et al. |
| 2011/0067099 A1 | 3/2011 | Barton et al. |
| 2011/0179445 A1 | 7/2011 | Brown et al. |
| 2011/0246495 A1 | 10/2011 | Mallinson |
| 2012/0052941 A1 | 3/2012 | Mo |
| 2012/0254456 A1 | 10/2012 | Visharam et al. |
| 2012/0272279 A1 | 10/2012 | Lim |
| 2013/0166452 A1 | 6/2013 | Song |
| 2013/0174196 A1 | 7/2013 | Herlein |
| 2013/0326024 A1 | 12/2013 | Chen et al. |
| 2014/0101118 A1 | 4/2014 | Dhanapal |
| 2014/0133695 A1 | 5/2014 | Lienhart et al. |
| 2014/0247931 A1 | 9/2014 | Swamy et al. |
| 2014/0280695 A1 | 9/2014 | Sharma et al. |
| 2014/0351045 A1 | 11/2014 | Abihssira et al. |
| 2015/0002749 A1 | 1/2015 | Ishizuka et al. |
| 2015/0020097 A1 | 1/2015 | Freed et al. |
| 2015/0287285 A1 | 10/2015 | Shore et al. |
| 2017/0118263 A1 | 4/2017 | Crabtree et al. |
| 2017/0208369 A1 | 7/2017 | Major et al. |
| 2017/0295503 A1 | 10/2017 | Govindaraju |
| 2018/0088895 A1 | 3/2018 | Pedersen et al. |
| 2018/0124438 A1 | 5/2018 | Barnett |
| 2018/0139507 A1* | 5/2018 | Toksoz ................ A63F 13/355 |
| 2018/0220201 A1 | 8/2018 | Stoksik et al. |
| 2018/0279002 A1 | 9/2018 | Cugi et al. |
| 2018/0287285 A1 | 10/2018 | Motohashi |
| 2018/0295134 A1 | 10/2018 | Gupta |
| 2018/0324473 A1 | 11/2018 | Sharma |
| 2019/0141367 A1 | 5/2019 | Loheide et al. |
| 2019/0164209 A1 | 5/2019 | Park |
| 2019/0306549 A1* | 10/2019 | Dietz .................. H04N 21/251 |
| 2019/0354943 A1* | 11/2019 | Mulye ................ H04N 21/2407 |
| 2020/0005388 A1* | 1/2020 | Lim .................... G06Q 30/0645 |
| 2022/0095001 A1 | 3/2022 | Harviainen |

* cited by examiner

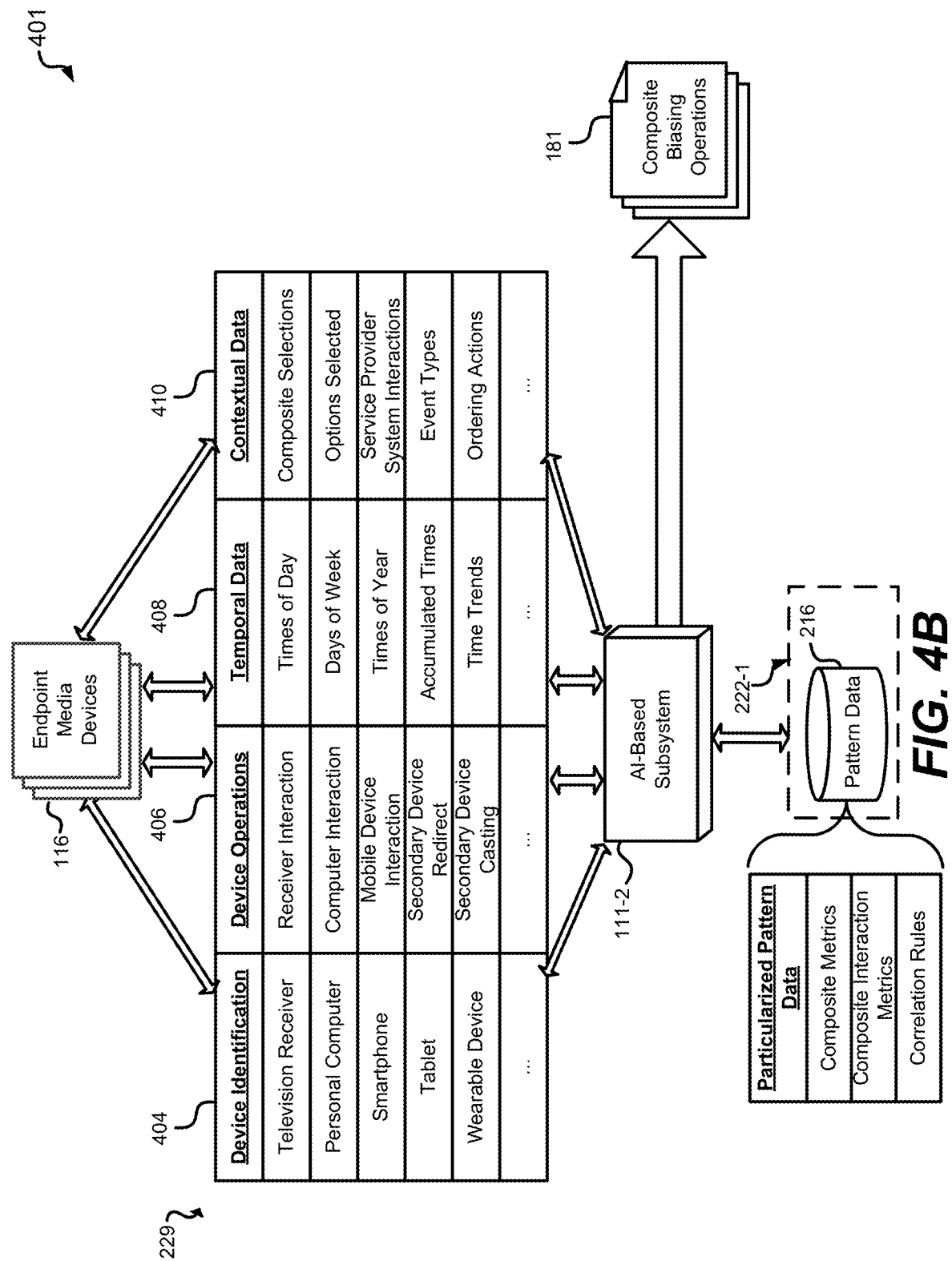

SYSTEMS AND METHODS FOR ADAPTING CONTENT ITEMS TO SECURED ENDPOINT MEDIA DEVICE DATA

CROSS-REFERENCE TO RELATED APPLICATION

This application is a continuation of U.S. patent application Ser. No. 16/748,567 filed Jan. 21, 2020, entitled "SYSTEMS AND METHODS FOR ADAPTING CONTENT ITEMS TO SECURED ENDPOINT MEDIA DEVICE DATA," the entire disclosure of which is hereby incorporated by reference, for all purposes, as if fully set forth herein.

BACKGROUND

This disclosure generally relates to content delivery, and more particularly to systems and methods for adapting content items to secured endpoint media device data.

The evolution of wireless networks and content distribution platforms may present a number of challenges and problems for content delivery within packet streams per Internet Protocol (IP), the ATSC (Advanced Television Systems Committee) 3.0 standard, or a like protocol. Such modes of content delivery may not be linear, in contrast to traditional television delivery, for example. And, still, there are needs for deeper integration with endpoint devices in a broadcast environment. Content viewers are in need of better viewer experiences and more tailored service offerings. Thus, there is a need for systems and methods that address such problems. This and other needs are addressed by the present disclosure.

BRIEF SUMMARY

Certain embodiments of the present disclosure relate generally to content delivery, and more particularly to systems and methods for adapting content items to secured endpoint media device data.

In various embodiments, methods, systems, and non-transitory, machine-readable media for adapting content items to device operations of an endpoint media device are disclosed, and may provide for one or a combination of the following. Blockchain data associated with a blockchain address may be processed by one or more processing devices. One or both of the blockchain data and the blockchain address may be mapped by the one or more processing devices to a first endpoint media device. A first content item and/or composite may be identified by one or more processing devices for delivery from a content provider system via one or more networks to the first endpoint media device, where the identifying the first content composite is based at least in part on the blockchain data. Transmission of the first content composite may be caused where, consequent to delivery of the first content composite to the first endpoint media device, the first endpoint media device or a second endpoint media device performs at least one operation relating to the first content composite. In various embodiments, consequent to delivery of the first content composite to the first endpoint media device, the first endpoint media device, the second endpoint media device, or a remote system that is remote from the one or more processing devices, the first endpoint media device, and the second endpoint media device, may cause one or more subsequent transmissions to a blockchain computer to cause creation of a blockchain token based at least in part on the at least one operation relating to the first content composite. In various embodiments, at least one communication received from the first endpoint media device or the second endpoint media device that is indicative of the at least one operation relating to the first content composite may be processed, and one or more subsequent transmissions to a blockchain computer may be caused so that a blockchain token is created based at least in part on the at least one operation relating to the first content composite. In various embodiments, the blockchain data associated with the blockchain address may correspond to a blockchain token representative of an interaction with a second content composite delivered to one or both of the first endpoint media device and the second endpoint media device.

In various embodiments, a content composite may be created for delivery in a packet stream from the content provider system via the one or more networks. The content composite may include adaptable content corresponding to a set of one or more audio and/or video packets corresponding to audio and/or video content. The creating may include adapting the adaptable content with the content item. Transmission of the content composite may be caused where the transmission of the content composite may include the transmission of first content composite and where, consequent to delivery of the content composite to the first endpoint media device, the first endpoint media device or the second endpoint media device may perform the at least one operation relating to the first content composite. In various embodiments, the blockchain address may be received by the one or more processing device from the first endpoint media device or the second endpoint media device, consequent to the selection of a user-selectable interface element allowing input of the blockchain address via the first endpoint media device or the second endpoint media device. In various embodiments, the blockchain data associated with the blockchain address may correspond to a blockchain token representative of an interaction with a remote system that is remote from the one or more processing devices, the first endpoint media device, and the second endpoint media device.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4B illustrates certain aspects of subsystem data flow, in accordance with disclosed embodiments of the present disclosure.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Figure 1:
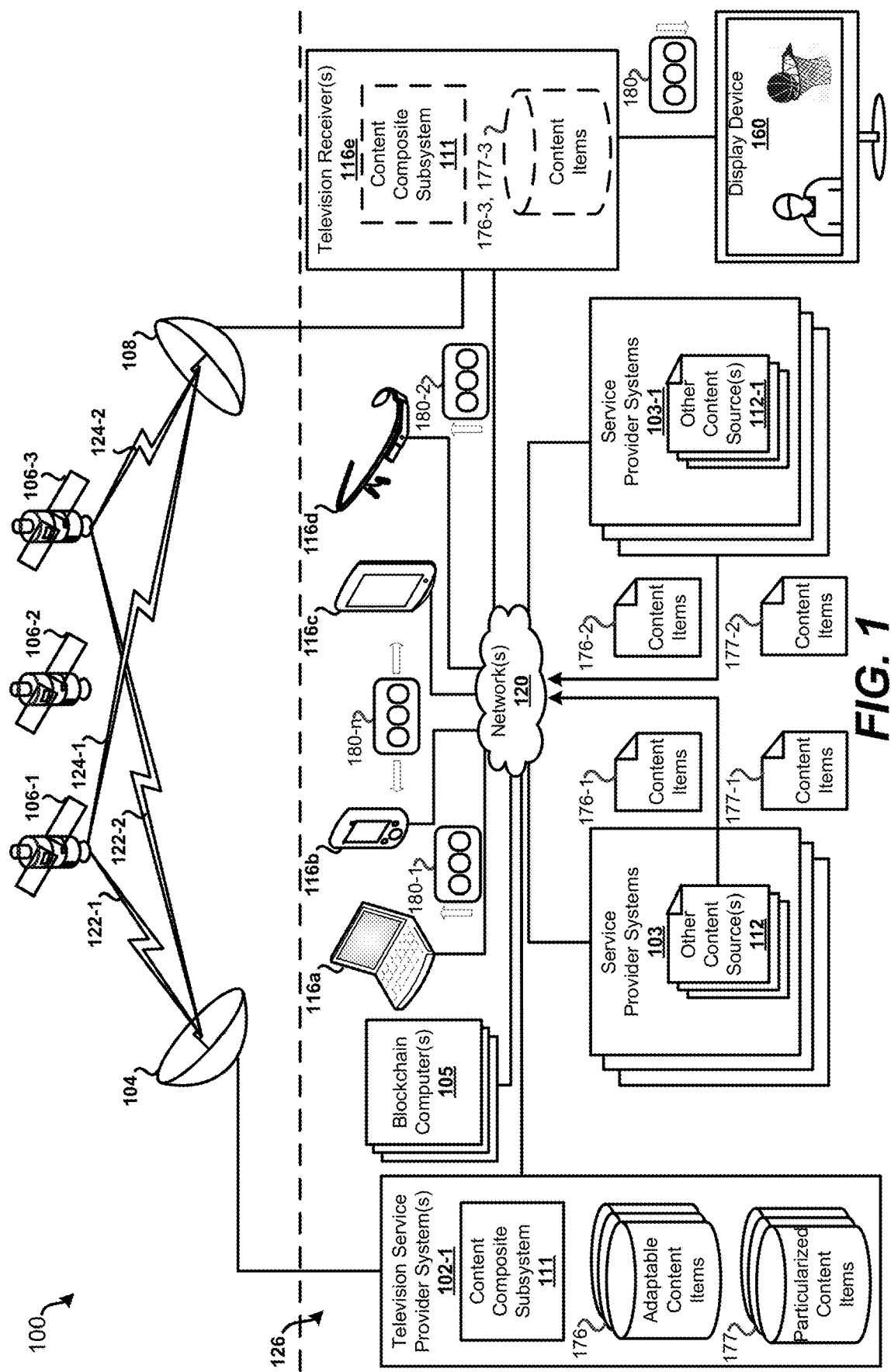
FIG. 1 illustrates a content distribution system, in accordance with disclosed embodiments of the present disclosure.

Various embodiments will now be discussed in greater detail with reference to the accompanying figures, beginning with FIG. 1. FIG. 1 illustrates a content distribution system 100, in accordance with disclosed embodiments of the present disclosure. For brevity, system 100 is depicted in a simplified and conceptual form, and may generally include more or fewer systems, devices, networks, and/or other components as desired. Further, the number and types of features or elements incorporated within the system 100 may or may not be implementation-specific, and at least some of the aspects of the system 100 may be similar to a cable television distribution system, an IPTV (Internet Protocol Television) content distribution system, and/or another type of media or content distribution system.

In general, the system 100 may include a plurality of networks 120 that can be used for bi-directional communication paths for data transfer between components of system 100. Disclosed embodiments may transmit and receive data, including video content, via the networks 120 using any suitable protocol(s), as is disclosed in co-pending U.S. patent application Ser. No. 16/383,300, filed Apr. 12, 2019, the disclosure of which application is incorporated by reference herein in its entirety for all purposes, as if fully set forth herein. The system 100 may include one or more content provider systems 102, one or more other data source systems 103, and media devices including adaptive routers 110 and various endpoint devices 116 communicatively couplable via the networks 120, further details of which are disclosed in co-pending U.S. patent application Ser. No. 16/655,104, filed Oct. 16, 2019, the disclosure of which application is incorporated by reference herein in its entirety for all purposes, as if fully set forth herein.

The system 100 may include content provider system 102-1, satellite uplink 104, a plurality of orbiting (e.g., geosynchronous) satellites 106, satellite receiver 108, one or more computing devices 116a-d, one or more television receivers 116e, one or more content sources 112 (e.g., online content sources), service provider systems 103-1, and one or more blockchain computers 105. In various embodiments, one or a combination of the one or more computing devices 116a-d, one or more television receivers 116e, and/or one or more display devices 160 may correspond to endpoint media devices 116.

Disclosed embodiments may include the use of blockchain systems as mechanisms in conjunction with the content item and composite provisioning features disclosed herein. The one or more blockchain computers 105 may be configured to one or more blockchain nodes of one or more blockchain networks. The one or more blockchain computers 105 may facilitate access to one or more blockchains of the one or more blockchain networks. Further aspects of the one or more blockchain computers 105 and the use of blockchain systems in accordance with various embodiments are disclosed further herein.

The content provider system 102-1 may include one or more adaptable content item 176 repositories and/or particular content item 177 repositories. The content provider system 102-1 may store adaptable content items 176 and/or particular content item 177 in the one or more repositories. The one or more repositories may be implemented in various ways. For example, one or more data processing systems may store adaptable content items. One or more relational or object-oriented databases, or flat files on one or more computers or networked storage devices, may store adaptable content items. In some embodiments, a centralized system stores adaptable content items; alternatively, a distributed/cloud system, network-based system, such as being implemented with a peer-to-peer network, or Internet, may store adaptable content items.

Adaptable content items 176 and/or particularized content items 177 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure. For example, the content items 176 may be adaptable content items that may correspond to visual and/or audiovisual advertisements with graphical and/or audio components particularized to certain types of products and/or services. In some embodiments, the advertisements may correspond to commercials to be presented during commercial breaks of television programming, such as televised events. In some instances, the content items 176 may be sourced by one or more of the service provider systems 103-1.

In some embodiments, the adaptable content items 176 may correspond to video and/or audio video file structures with one or more transition points, hooks, frames, windows, and/or the like for merging with one or more particularized content items, content items 177, particularized to certain products and/or services. As disclosed herein, the adaptable content items 176 may be merged, blended, joined, overlaid, customized, and/or the like in any suitable manner with other particularized content items 177 in order to create electronic content composites 180 particularized to certain types of products and/or services. In various embodiments, as further disclosed herein, the adaptable content items 176 and/or the other content items 177 may be formatted, rescaled, cropped, image characteristic (e.g., color, brightness, transparency, opaqueness, contrast, etc.) adjusted, and/or otherwise prepared to facilitate the merging, blending, joining, overlaying, customizing, and/or the like and presentation by endpoint media devices 116 as disclosed herein.

In various embodiments, the particularized content items 177 may correspond to content that is particularized to certain types of products and/or services and that, in various embodiments, may be sourced by one or combination of the system 102, one or more of the service provider systems 103-1, and/or the endpoint media device 116 (e.g., in instances where personalization data that may form at least part of a particularized content item 177). In various embodiments, the service provider systems 103-1 may correspond to one or more sources of data and/or services corresponding to the adaptable content items 176 and/or the particularized content items 177, and particularized content items 177 may correspond to the specific data and/or services sourced by a specific service provider system 103-1. For example, the data may correspond to a particular coupon, matrix code such as a QR code, trailer, movie content, and/or the like. In some embodiments, particularized content items 177 may include personalized content that is particular to one or more viewers. In some embodiments, the personalized content may be separate from the particularized content items 177. As disclosed above, the adaptable content items 176 and/or the content items 177 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure.

In various embodiments, content items 176 and/or 177 may be actively gathered and/or pulled from one or more data sources 112, for example, by accessing a repository and/or by "crawling" various repositories. Additionally or alternatively, the content provider system 102-1 and/or the subsystem(s) 111 may wait for updates from one or a combination of the content source systems 112. Content items 176 and/or 177 pulled and/or pushed from the one or more data sources 112 may be transformed, and the transformed content items 176 and/or 177 and/or other data generated based thereon may be made available by the content provider system 102-1 and/or the subsystem(s) 111 for use by the subsystem(s) 111 in conjunction with content composites 180.

In some embodiments, the content provider system 102-1 may provide the adaptable content items 176 and, in some embodiments, the particularized content items 177, to the endpoint media device 116 as part of a data transfer that is sent through the satellite 106. For example, in some embodiments, the television receiver 116e may receive a downlinked satellite signal that includes the data for adaptable content items 176 and/or particularized content items 177 transferred on a designated line in the vertical blanking interval (VBI) or other portion of the broadcast service transmission that does not interfere with other transmitted content. Additionally or alternatively, the content provider system 102-1 may provide adaptable content items 176 and/or particularized content items 177 to the television receiver 116e via the one or more data networks 120. In some embodiments, the content provider system 102-1 may store the adaptable content items 176 and/or particularized content items 177 in an adaptable content item 176 repository and/or a particularized content items 177 repository included in or otherwise accessible to the content provider system 102-1. In some embodiments, the television receiver 116e may store the adaptable content items 176 and/or particularized content items 177 in an adaptable content item 176 repository and/or a particularized content items 177 repository included in the television receiver 116e or otherwise local to the television receiver 116e. Consequently, the television receiver 116e may use one or more of the adaptable content items 176 and one or more of the particularized content items 177 in accordance with embodiments disclosed herein. In some embodiments, additionally or alternatively to providing the adaptable content items 176 and/or particularized content items 177, the content provider system 102-1 may provide content composites 180 to the television receiver 116e through such means.

The content provider system 102-1 may include a content composite subsystem 111 in whole or in part. In some embodiments, additionally or alternatively, one or more of the endpoint media devices 116 may include a content composite subsystem 111 whole or in part. In some embodiments, additionally or alternatively, one or more service provider systems 103-1 may include a content composite subsystem 111 in whole or in part. The content composite subsystem 111 may be configured to facilitate various content adaptation features in accordance with various embodiments disclosed herein.

The system 102 with the content composite subsystem 111 may be configured to perform one or more methods for facilitating adaptive content items for delivery in a packet stream, such as methods for containerizing and adapting content items, as disclosed herein. In various embodiments, part or all of the method may be performed while an endpoint media device 116 is receiving programming content and/or is outputting programming content for display. In various embodiments, at least part of the method may be performed in advance of the programming content and, thus, may be performed while is scheduled to output programming content but before the programming content is broadcast to endpoint media devices 116 and/or before the programming content output by an endpoint media device 116 for display. In various embodiments, one or more media devices (e.g., the devices 116a-e and/or the system 102-1) may perform all or part of the method, with a single media device or multiple media devices performing the method.

One or more content composites 180 may be created to facilitate delivery of the composite 180 and display of one or more content items 176 (in some instances, as modified with particular items 177) in conjunction with the televised event or other type of audiovisual content (movies, shows, etc.). One or more indicators of one or more state changes with respect to the content (e.g., event that is televised, show, etc.) may be detected. The one or more state changes may include upcoming state changes, such as commercial breaks upcoming within a time threshold (e.g., a number of seconds and/or minutes). In some embodiments, the one or more content composites 180 may be created and/or delivered consequent to the detecting the one or more state changes. In some embodiments, the one or more content items 176 may be adapted with one or more particular items 177 consequent to the detecting the one or more state changes.

In some embodiments, the creating the content composite 180 and/or the adaptation of the one or more content items 176 with one or more particular items 177 may be a function of a current geolocation of the endpoint media device 116, with a set of rules mapped to the current geolocation and specifying geo-specific criteria for creating content composites 180, selecting content items 176 and particularized content items 177, adapting the content items 176 with particularized content items 177, and provisioning the content items 176 and particularized content items 177. The current geolocation of the media device may be determined at a time when the first content is being output for display. With the content composite 180 created and, in some instances, the one or more content items 176 adapted, the one or more content items 176 corresponding to the programming content may be output for display, e.g., during the commercial break, where the content items 176 and particularized content items 177 are selected based at least in part on location metadata mapped to the content items 176 and particularized content items 177 specifying location indicia for the content items 176 and particularized content items 177. Some sets of rules may specify a threshold distance, and the content items 176 and particularized content items 177 may be selected when a distance between the current geolocation of the endpoint media device 116 and the location indicia for the content items 176 and particularized content items 177 satisfies the distance threshold. Some sets of rules may specify that only certain types of particularized content items 177 may be selected when the distance threshold is not satisfied (e.g., promo codes but not coupons).

Disclosed embodiments may confirm and verify that a content item 176 (in some instances, as modified with one or more particular content items 177, such as a coupon, matrix code such as a QR code, particularization data, etc.) was transmitted to an endpoint media device 116. Disclosed embodiments may confirm and verify that the modified or unmodified content item 176 was presented with a display device at the endpoint media device 116 (which display device may be integrated with the endpoint media device 116 or otherwise communicatively coupled to the endpoint media device 116). Disclosed embodiments may confirm and verify to what extent the modified or unmodified content item 176 was presented (in full or to a lesser extent). Disclosed embodiments may confirm and verify that the modified or unmodified content item 176 was shown to an intended end user if and when utilizing encryption and/or an encryption flag. Disclosed embodiments may confirm and verify detection of one or more operations executed consequent to the presentation (e.g., scanning a matrix code, loading a coupon and/or another particularized content item 177 into mobile app such as a digital wallet of the endpoint media device 116, utilizing the particularized content items 177 such as to order a product and/or service, etc.) and metrics of the operations (e.g., time of execution).

Such confirmations may take the form of return channel notifications from the endpoint device 116 to the system 102, which may contribute to the observation data 229 and feedback loop features disclosed further herein. In addition or in alternative to such communications from endpoint devices 116, the system 102 may receive pushed and/or pulled notifications from one or more service provider systems 103 that indicate when particularized content items 177 have been used by the endpoint devices 116 with respect to the systems 103 (e.g., to a system 103, uploading at least a portion of a content item 177; communicating at least a portion of a content item 177 such as code, accessing using a URL of a content item 177; transferring, presenting, or otherwise providing an image capture of a content item 177; and/or the like). Such notifications may also contribute to the observation data 229 and feedback loop features. In addition or in alternative, as disclosed further herein, some embodiments may include received pushed and/or pulled notifications corresponding to indicia of such viewer interactions and transactions from one or more blockchain computer 105.

In various embodiments, an endpoint device 116 may be configured to operate as a payment device, such as a physical payment card to make transactions, that communicates with an access device to perform operations for exchanging information and effecting transactions. To that end, the access device may be provided with a payment credential assoicated with a user of the device 116. In some instances, the access device may correspond to a website operated by the provider system 103 to enable transactions to be conducted with various users. The provider system 103 and/or the access device may transmit transaction data to the system 102, which data may be utilized to contribute to the observation data 229 and facilitate the biasing 181 disclosed herein. The data may include one or a combination of purchased product/service identifiers, transaction data/time, price, merchant name, merchant identifier, location identifier, and/or the like.

Figure 2:
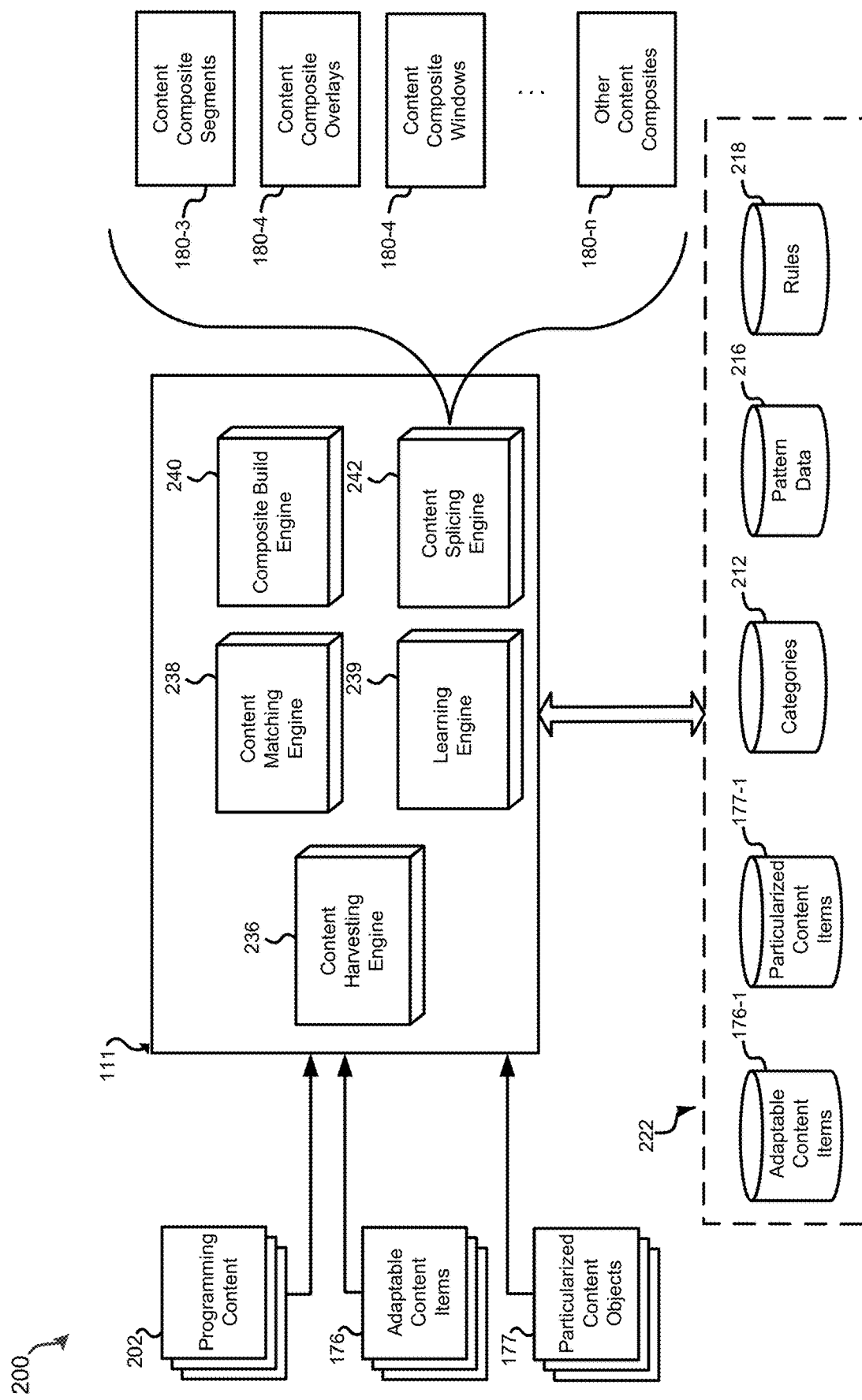
FIG. 2 illustrates a diagram of an adaptive content composite system, in accordance with disclosed embodiments of the present disclosure.

FIG. 2 illustrates a functional diagram of an adaptive content composite system 200, in accordance with disclosed embodiments of the present disclosure. In various embodiments, the content composite system 200 may be included in whole or in part in the content provider system 102-1 and/or an endpoint media device 116. In some embodiments, the content composite system 200 may be separate from, and provide content to, the content provider system 102-1. In some embodiments, the content composite system 200 may be included in the end-user system and may be included in the television receiver 116e and/or one or more of the computing devices 116. In some embodiments, various features of the content composite system 200 may be distributed between the television receiver 116e and upstream of the television receiver 116e. Likewise, in some embodiments, various features of the content composite system 200 may be distributed between one or more of the computing devices 116 and upstream of the one or more computing devices 116. While not all components of the adaptive content composite system 200 are shown, the system 100 may include one or a combination of such components.

As depicted, the content composite system 200 includes a content composite subsystem 111. The content composite subsystem 111 may include or otherwise correspond to an audiovisual control engine that, as with disclosed embodiments of the other engines, may include instructions retained in processor-readable media and to be executed by one or more processors. The content composite subsystem 111 may be communicatively coupled with interface components and communication channels (e.g., of the television receiver 116e and/or the computing device 116, which may take various forms in various embodiments as disclosed herein) configured to receive programming content 202, which may correspond to televised sporting events, movies, television programs, portions thereof, etc. In various embodiments, the programming content 202 may include audiovisual content broadcast and/or otherwise transmitted by the content provider system 102-1 and/or one or more other service providers 103-1. The programming content 202 may include various components, including without limitation, one or more video tracks, audio tracks, audio video tracks, metadata tracks, close captioning information, and/or the like. In some embodiments, the content composite system 200 may retain received programming content 202 in content storage 222. The content storage 222 may include any suitable form of storage media, such as any suitable form disclosed herein.

The content composite subsystem 111 may be further configured to receive adaptable content items 176 and particularized content items 177. The content composite subsystem 111 may include a harvesting engine 236 configured to aggregate adaptable content items 176, particularized content items 177, and/or programming content 202 in order to facilitate content splicing features disclosed herein. The content composite subsystem 111 may include a matching engine 238, which, in various embodiments, may be configured to analyze, classify, categorize, characterize, tag, and/or annotate adaptable content items 176, particularized content items 177, and/or programming content 202.

The content composite subsystem 111 may include a content splicing engine 242. In some embodiments, the content splicing engine 242 may include a multiplexer. In various embodiments, the multiplexer may create a digital stream of data packets containing the video, audio, and, in some embodiments, the metadata to output the programming content 202, adaptable content items 176, and/or the composites 180 created with selected adaptable content items 176. In various embodiments, the content splicing engine 242 may be implemented at the receiver 116e, the device 116, and/or the service provider system 102-1.

In some embodiments where the content splicing engine 242 is implemented at the service provider system 102-1, the multiplexed data stream may be transmitted via the one or more networks 124 for provisioning to computing devices 116 or via a particular transponder stream via a transponder of a satellite four provisioning to receivers 116e. The multiplexer may create a digital stream of data packets containing the video, audio, and entitlement control messages (ECMs), to be transmitted on the transponder data stream. The data stream, which includes video and/or audio data packets that are not scrambled, may be passed to a scrambling engine, which may use a control word to scramble video or audio present in a data packet. Some audio and video packets may also pass through with no scrambling, if desired by the content provider system 102-1. A control word generator may generate the control word that is used by a scrambling engine to scramble the video or audio present in the data packet. Control words generated by the control word generator may be passed to a security system, which may be operated by the television service provider or by a third-party security provider. The control words generated by control word generator may be used by security system to generate an ECM. Each ECM may indicate two control words. The control words indicated may be the current control word being used to scramble video and audio, and the control word that will next be used to scramble video and audio. The security system may output an ECM to the multiplexer for transmission to subscribers' set-top boxes. Each data packet, whether it contains audio, video, an ECM, or some other form of data, may be associated with a particular PID. This PID may be used by the set-top box in combination with a networking information table to determine which television channel the data contained within the data packet corresponds. Accordingly, the transponder data streams may contain scrambled video packet stream and audio packet stream and also an encrypted ECM packet stream which contains the control words necessary to descramble the scrambled video and audio packets.

In some embodiments, the harvesting engine 236 may be configured to receive, pull, process, buffer, organize, rank, and/or store adaptable content items 176, particularized content items 177, and/or programming content 202. In various embodiments, the content provider system 102-1, the television receiver 116e, and/or the computing device 116 may include one or more applications to facilitate the subsystem 111 analyzing and consolidating data feeds and/or event updates received from various data sources 112. As an example, data feeds and/or event updates may include, but are not limited to, updates (real-time and/or otherwise) and/or continuous data streams received from one or more data sources 112, which may include real-time events related to promotions, coupons, sales, special offerings, discounts, sports event information, Twitter® feeds, Instagram® posts, Facebook® updates, and/or the like.

As disclosed above, the adaptable content items 176 may correspond to audiovisual advertisements particularized to certain products and/or services. In some embodiments, the advertisements may correspond to commercials to be presented during commercial breaks of the programming content 202. In various embodiments, the content items 176 may include audiovisual content broadcast and/or otherwise transmitted by the content provider system 102-1. In some embodiments, adaptable content items 176 may be pushed by the content provider system 102-1 to the subsystem 111. In addition or in alternative, adaptable content items 176 may be pulled by the subsystem 111 (e.g., by the harvesting engine 236) from the content provider system 102-1.

The particularized content items 177 may correspond to content that is particularized to certain types of products and/or services and that is sourced by one or more of the service provider systems 103-1. In various embodiments, the service provider systems 103-1 may correspond to one or more sources of data, products, and/or services corresponding to the adaptable content items 176, and particularized content items 177 may correspond to the specific data and/or services sourced by a specific service provider system 103-1 for one or more specific products and/or services. As disclosed above, the adaptable content items 176 and/or the content items 177 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure.

In various embodiments, sets of one or more adaptable content items 176 and/or sets of one or more content items 177 may be transmitted to the subsystem 111 in batches. For example, sets of one or more adaptable content items 176 and/or sets of one or more content items 177 may be transmitted to the subsystem 111 on a periodic or otherwise scheduled basis. The subsystem 111 may store the adaptable content items 176 locally and, subsequently select one or more of the adaptable content items 176 when needed for presentation during an upcoming break in the programming content 202 and/or when needed for presentation during the programming content 202 based at least in part on the subsystem 111 determining specifications of the programming content 202, a temporal progression in the programming content 202 (e.g., the fourth quarter, the second round, etc.), a state change in the event (e.g., a score change, one team or competitor leading or falling behind, etc.), and/or the like.

In various embodiments, sets of one or more adaptable content items 176 and/or sets of one or more content items 177 may be transmitted to the subsystem 111 on an as-needed basis when the subsystem 111 is receiving programming content 202 corresponding to a certain type (e.g., a televised sporting event), is scheduled to receive such programming content 202, is predicted to receive programming content 202 based at least in part on a detected viewing pattern of past viewing of previous programming content 202 (e.g., of a certain type of event, at certain times, on certain days, etc.), and/or is predicted to receive programming content 202 based at least in part on a detected pattern of past viewer responses to content composites for previous programming content 202 of that type. Additionally or alternatively, in some embodiments, sets of one or more adaptable content items 176 and/or sets of one or more content items 177 may be selected (e.g., the service provider system 102-1) as tailored for particular event viewing habits, ordering patterns, and inferred interests of viewers.

In various embodiments, sets of one or more adaptable content items 176 may be selected (e.g., by the service provider system 102-1) for particular time periods and may be transmitted to the subsystem 111 with an assignment (e.g., by way of tag data or other metadata) for the designated time period. Additionally or alternatively, in some embodiments, sets of one or more adaptable content items 176 may be selected (e.g., by the service provider system 102-1) for particular channels and/or television programs and may be transmitted to the subsystem 111 with an assignment (e.g., by way of tag data or other metadata) for the designated channels, shows, movies, and/or television programs. The transmission of the sets of one or more adaptable content items 176 may be in response to the subsystem 111 pulling the sets of one or more adaptable content items 176 from the service provider system 102-1. For example, the subsystem 111 may pull adaptable content items 176 based at least in part on detecting programming content 202 currently being viewed via a television receiver 116e or computing device 116, detecting programming content 202 scheduled to be viewed or recorded, predicting programming content 202 of interest to a viewer based on detected viewing patterns and/or patterns of interacting with content items 176, 177, determining upcoming programming content 202 based on electronic programming guide information received, and/or the like.

In a similar manner, sets of one or more content items 177 may be pulled from or pushed by one or more service provider systems 103-1, in various embodiments using one or more of the various methods disclosed, to the subsystem 111 directly or indirectly (e.g., by way of the content provider system 102-1, which may then transmit the content items 177 to the subsystem 111) for particular time periods, with assignments for designated channels, shows, movies, and/or television programs. For example, in conjunction with the selection of sets of one or more adaptable content items 176, sets of one or more content items 177 that match the one or more adaptable content items 176 may be pulled from one or more service provider systems 103-1. In various examples, the matching may be based at least in part on specifications of the event, a temporal progression in the event (e.g., the fourth quarter, the second round, etc.), a state change in the event (e.g., a score change, one team or competitor leading or falling behind, etc.), and/or the like.

The subsystem 111 may use the rules 218 to adaptively control content composite creation, the delivery of such content, and interactions with such content. The rules 218 may include conditions corresponding to offer particulars of particularized content items 177 and may specify one or more operations to be performed when one or more of the conditions are satisfied. The conditions may, in some instances, be received from one or more provider systems 103. The categorization 212 of the harvested regulations and updated regulations may be used to create various sets of rules 218 governing the creation and provisioning of particularized content composites 180. The various sets of rules 218 may govern the creation and provisioning of particularized content composites 180 as a function of a location of a particular receiver 116e and/or device 116. Hence, different sets of rules 218 may apply to different locations. Further, various sets of rules 218 may provide for various types of restrictions and/or specifications on creating and/or provisioning content composites 180. In addition to geolocation restrictions/specifications, the various types of restrictions and/or specifications may include time restrictions, such as limits on a time of day when content composites 180 may be presented, limits on time in advance particular event (e.g., days, hours, etc.) and/or portion thereof ahead of which content composites 180 may be presented, and the like. Additionally or alternatively, the various types of restrictions and/or specifications may include restrictions on and/or specifications of types of content (e.g., ratings for different audience designations, content designations, etc.) for which content composites 180 may or may not be presented and the manner in which content composites 180 may be presented for the different types of programs and/or viewers (e.g., adult-directed ads may not be presented during children-directed shows and/or to viewers identified as children). Thus, provisioning of content composites 180 may be further differentiated according to show type and/or viewer type, with time, place, and/or manner restrictions/specifications contingent on show type and/or viewer type. Restrictions on and/or specifications of the manner in which content composites 180 may be presented may include differentiating types of devices (e.g., smart phone versus laptop computer, laptop computer versus television receiver, etc.) which will display the content composites 180.

To facilitate geo-discrimination to differentiate which sets of rules 218 apply to a given content provisioning instance with respect to a program and which content items 176, 177 to select and present as a function of the current device 116 location, disclosed embodiments may provide for capturing and analyzing location data 179 for the device 116 to determine a current location of the device 116. The current location of the device 116 may also be used to identify, by a system 102, 103 and/or an application of the device 116, when a content item 177 stored by the device 116 (e.g., in a digital wallet) is applicable based at least in part on location metadata of the content item 177 that specifies a product/service provider location that is within a threshold distance from the current location. The digital wallet may include a software program, such as an application operating on the device 116, that allows the user to conduct ecommerce transactions. The digital wallet may store user profile information, such as user identification information and contact information, payment credentials (e.g., a payment card number, a personal account number, etc.), bank account information, payment cards, blockchain addresses, coupons, offers, and/or the like which may be used in a variety of transactions to facilitate purchase and payment processes. The threshold distance may be specified by the location metadata, user preferences, application settings, and/or the system 102, 103. In instances where the threshold is satisfied, one or more push notifications may be transmitted from one of the systems 102, 103 to the endpoint media device 116; the application of the endpoint media device 116 may be invoked, awakened, opened, otherwise activated; and/or the application may pop up a notification on a display of the endpoint media device 116 to alert the user to the content item 177 and the proximate provider location.

Location data 179 may also be captured to facilitate geo-sensitive adaptive content splicing adaptive content splicing with respect to content 202 corresponding to a televised event as a function of a location detected for the device 116 that receives the content and is to cause display of content composites 180 in conjunction with the content. In various embodiments, the matching engine 238 may include a location correlation engine that may correlate location data 179 to a set of one or more zip codes (or other postal codes) and a corresponding rule set identifier for a set of one or more rules 218 mapped to the set of one or more zip codes (or other postal codes) via identifiers keyed with one or more tables and/or indexes.

In various embodiments, location data may be determined by television receivers 116e and/or devices 116, and such data may be sent to the system 102-1. The television receivers 116e and/or devices 116 may, in some embodiments, have location detection capabilities based at least in part on location data provided by way of device GPS capabilities, Wi-Fi, cellular, other access points, subscriber/ account information, and/or the like techniques for determining a current location of the respective receiver 116e and/or device 116, and corresponding location data 179 may be transmitted to the system 102-1. In some embodiments, the system 102-1 may gather the location data 179. In some embodiments, where the location data 179 does not explicitly indicate a geolocation, the system 102-1 may determine geo-locations by cross-referencing subscriber/account identifiers with stored geolocation data associated with subscribers/accounts.

Additionally, in some embodiments, the receiver 116e and/or device 116 may be capable of communicating with a Global Positioning System (GPS) in order to determine to location of the respective receiver 116e and/or device 116. The antenna may be a GPS receiver or otherwise include a GPS receiver. In various embodiments, communication with the receiver 116e and/or device 116 may be conducted with a single antenna configured for multiple purposes (e.g., cellular, transactions, GPS, etc.), or with further interfaces (e.g., three, four, or more separate interfaces). In some embodiments, an application installed on the receiver 116e and/or device 116 may cooperate with the system 102-1 to facilitate tracking of locations of the receiver 116e and/or device 116. For example, the receiver 116e and/or device 116 may transmit location data 179 to any suitable backend system component. The location data 179 may be a combination of data based on one or a combination of GPS, Wi-Fi, cellular, device sensor(s) such as a barometric sensor or accelerometer, RFID device signals, and/or other techniques for determining a current location of the receiver 116e and/or device 116.

The receiver 116e and/or device 116 may access the one or more networks 120 through one or more wireless links to one or more access points. The access points may be of any suitable type or types. For example, an access point may be a cellular base station, an access point for wireless local area network (e.g., a Wi-Fi access point), an access point for wireless personal area network (e.g., a Bluetooth access point), etc. The access point may connect the receiver 116e and/or device 116 to the one or more networks 120, which may include the Internet, an intranet, a local area network, a public switched telephone network (PSTN), private communication networks, etc. In some embodiments, access point(s) may be used in obtaining location data 179 for the receiver 116e and/or device 116.

Figure 3:
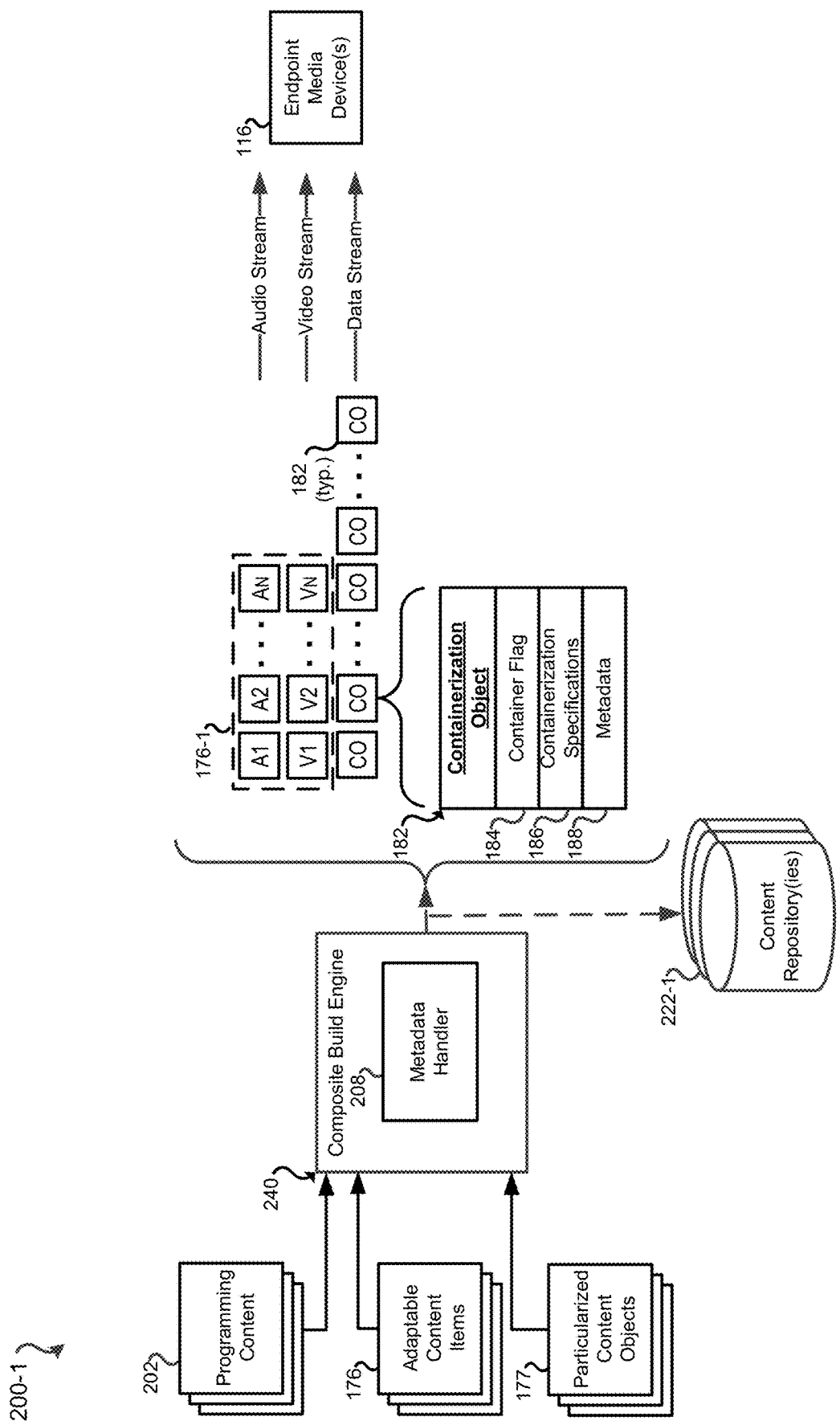
FIG. 3 illustrates a composite build engine, in accordance with disclosed embodiments of the present disclosure.

FIG. 3 is a simplified illustration of a composite build engine 240, in accordance with disclosed embodiments of the present disclosure. In various embodiments, the composite build engine 240 may be included in the subsystem 111 or may be separate from the subsystem 111. The composite build engine 240 may, in some embodiments, be included in the content provider system 102-1. Having processed an adaptable content item 176, the subsystem 111 may create one or more content composites 180 that may include the adaptable content item 176.

To create the content composites 180, disclosed embodiments may provide the content item 176 with containerization objects 182 that each containerize a set of data as a persistent object in time. Each containerization object 182 may be configured to function in a broadcast environment while facilitating the various features disclosed herein. For example, among other things, the containerization object 182 may create the ability for the disclosed deeper integration with endpoint devices 116 in a broadcast environment. With the containerization object 182, the content composites 180 may allow the content item 176 to be treated as an object wrapped with an identity and with one or more layers of encryption.

The composite build engine 240 may configure the containerization object 182 to include a container flag 184. The container flag 184 may include one or more parameters that indicate one or more containerization specifications 186. The container flag 184 may be thin and may indicate other components packetized in the containerization object 182. For example, in various embodiments, container flag 184 may include indicia of one or a combination of: an identifier of the content item 176 in the container, boundaries of the set of one or more audio and/or video packets that form the content item 176, access and reference to one or more other containerization specifications 186, access and reference to other metadata 188, and/or the like. The content item identifier may correspond to a field with parameters that identifies the content item 176.

Further, the composite build engine 240 may configure the containerization object 182 to include the containerization specifications 186 to facilitate performance of a set of one or more operations by the one or more endpoint media devices 116 with respect to the content item 176 consequent to the one or more endpoint devices 116 receiving the content composite 180. In various embodiments, the containerization specifications 186 may include one or a combination of instructions, metadata, personalization content or instructions to fetch personalization content, and/or the like to specify and facilitate performance of the set of one or more operations by an endpoint media device 116. In some embodiments, the containerization specifications 186 may include a particularized content item 177 or instructions to fetch a particularized content item 177.

Accordingly, the content composite 180 may include the content item 176 and the containerization object 182. Further, in various embodiments, the content composite 180 may include a particularized content item 177 at the time the content composite 180 is transmitted to one or more endpoint media devices 116, separate from or grafted into the content item 176 such that the content item 176 is an adapted content item 176 adapted with the particularized content item 177. In some embodiments, the content composite 180 may not include a particularized content item 177 at the time the content composite 180 is transmitted to one or more endpoint media devices 116. In such instances, the particularized content item 177 may be fetched per the containerization specifications 186 from the system 102, 100, another data source 103, or from storage of the endpoint media device 116, and may be used by an endpoint media device 116 to adapt the content item 176. The containerization specifications 186 may include instructions and build specifications according to which the endpoint media device 116 may merge the pulled/retrieved particularized content item 177 with the content item 176. As part of the instructions and build specifications, the containerization specifications 186 may specify that the particularized content item 177 (e.g., a particular coupon, matrix code such as a QR code, trailer, movie content, and/or the like) contain one or more date and/or time attributes (e.g., a time stamp) indicate of one or a combination of when the item was created, when the item is to be output by the endpoint media device 116 for display, when the item is stored by the endpoint media device 116 (e.g., in a digital wallet), and/or the like. In some embodiments, the one or more date and/or time attributes may be stored with the metadata 188.

In various embodiments, the content composite 180 may further include personalization content personalized to the end user of the endpoint media device 116 at the time the content composite 180 is transmitted to one or more endpoint media devices 116, separate from or grafted into the content item 176 such that the content item 176 is an adapted content item 176 adapted with the personalization content. In some embodiments, the content composite 180 may not include personalization content at the time the content composite 180 is transmitted to one or more endpoint media devices 116. In such instances, the personalization content may be fetched per the containerization specifications 186 from the system 102, 100, another data source 103, or from storage of the endpoint media device 116, and may be used by an endpoint media device 116 to adapt the content item 176 according to instructions and build specifications of the containerization specifications 186.

The subsystem 111 may transmit the content composite 180 to one or more endpoint media devices 116, and, in some embodiments, may broadcast the content composite 180 to a plurality of endpoint media devices 116. The subsystem 111 may transmit the content composite 180 in accordance with composite transmission specifications. The composite transmission specifications may at least partially specify transmission parameters that govern transmission of the containerization object 182 in a data stream with the set of one or more audio and/or video packets in audio and/or video streams corresponding to the content item 176.

The content item 176 may correspond to a specific unit within the content stream. The specific unit in the content stream may correspond to a section of the video stream that includes the set of one or more audio and/or video packets for the content item 176. The composite transmission specifications may specify how the containerization object 182 should be transmitted in the data stream with the content item 176, how many instances of the containerization object 182 should be created and transmitted, how should some instances of the containerization object 182 be time/place shifted in advance of the packets corresponding to the content item 176, and/or the like. Thus, the composite transmission specifications may provide for one or more instances of the containerization object 182 particularized for the individual content item 176 to be transmitted within the data stream of the content stream, with the content item 176 transmitted in the audio and/or video stream(s). Accordingly, a number of instances of the containerization object 182 with the content item identifier, as specified by the composite transmission specifications, may be embedded in a section of the data stream that indicates the content item 176. Not only may the containerization object 182 with the container flag 184 be carried as a data stream with the audiovideo content stream, flagging the content item 176, it may also be replicated and encoded in a carousel manner per the composite transmission specifications to facilitate pick-up mid-stream of the content item 176, and/or in advance of the content item 176 in the stream to facilitate forward identification of the upcoming content item 176.

The container flag 184 and its indicia may be encrypted and transmitted to the endpoint media device(s) 116 in the encrypted state with the content composite 180. Additionally or alternatively, the containerization specifications 186 may be encrypted and transmitted to the endpoint media device(s) 116 in the encrypted state with the content composite 180. Accordingly, disclosed embodiments may add an encrypted container flag 184 to the content item 176.

In various embodiments, the encrypted container flag 184 may govern access by the endpoint media device 116 to one or more other components of the content composite 180. Consequent to delivery of the content composite 180 to the endpoint media device 116, the endpoint media device 116 may decrypt the encrypted container flag 184. Once the endpoint media device 116 decrypts the container flag 184, the endpoint media device 116 may have access to, for example, the metadata of the content composite 180, such as the instructions of the containerization specifications 186, other containerization specifications 186, and/or the other metadata 188.

The container flag 184 may include indicia that identifies the state and extent of one or more layers of encryption of the content composite 180. One or more of the components of the content composite 180 may be encrypted. The encryption may include a lightweight, point-to-point encryption for specific components of the content composite 180, which may be advantageous to avoid bogging down processing in view of relatively heavier processing needs for video of content items 176 and generally shorter durations of content items 176.

The indicia may flag one or more objects and/or containers for the specific unit(s) within the content stream without the entire data stream being encrypted. The subsystem 111 may all or part of content composite 180 contingent on the extent of the personalization of the content composite 180. For example, when the content composite 180 is transmitted with personalization content, the personalization content may be encrypted. As one example out of many possibilities, when a content item 176 is adapted with a shopping list prepared for an identified viewer, at least the portion of data corresponding to the shopping list may be encrypted, whereas the balance of the content item 176 that is not personalized may not encrypted. Accordingly, a partially customized content composite 180 and/or content item 176 may only be partially encrypted. However, a highly customized content composite 180 and/or content item 176 may be entirely or substantially entirely encrypted, commensurate with the extent of the customization for the identified viewer. For example, if the content item 176 is due to an identified viewer selection (say, a prior purchase, such as the viewer having purchased viewing rights to a movie or other particular content), then, after scraping an ID that a viewer has allowed such, the content composite 180 and/or content item 176 (which, for example, may be directed to opening up 1-to-1 connection to access a digital ticket, access to a digital copy of the content, bonus content, a content item that requires tracking such as a coupon for a pay-per-view, etc.) may be entirely or substantially entirely encrypted. Such content may be highly customized and may include watermarking. One or more particularized content items 177, for example, may include watermarks for merging with content items 176 as disclosed herein.

The content composites 180 may provide for advantages with greater layers within a content stream more based around computer language. In some embodiments, various options for content items 176 may be broadcasted, with only a subset of the content items 176 being presented by particular endpoint media devices 116. The indicia of the container flags 184 of the content composites 180 may allow for filtering the content composites 180 according to attributes of the endpoint media device 116 and/or the endpoint viewer so the matching ad is presented to the identified viewer/viewer type, pursuant to the differentiated interaction with mobile app, etc. For example, flag indicia may include layer flag indicia that indicates this content item is for unlocked devices or only locked devices. One layer may allow for identifying different types of the endpoint media devices 116 that differ in capabilities, which, in some embodiments, may be determining based at least in part on pulling information (e.g., device specifications) from the particular endpoint media device 116. Such device type identification may further allow for targeting a type of endpoint media device 116 with different types of content items 176 and different content attributes. For example, such targeting may include filtering content items 176 based at least in part on the differences in frame rate of the content items 176 as a function of the endpoint media device type and/or capabilities. Different content items 176 may be filtered for different endpoint media device 116 (e.g., content items 176 with frame rates associated with fast-changing content may not be mapped to devices with lesser capabilities). As another example, such targeting may include filtering content items 176 based at least in part on the differences in how the content items 176 are compressed as a function of the endpoint media device type and/or capabilities.

One layer may allow for determining endpoint media device 116 authentication. The endpoint media device 116 authentication may be dependent on discovery processes that the determine what is on the device that can be used to sufficiently authenticate the endpoint media device 116. For example, the discovery processes may determine and utilize a SIM card of a mobile device, television receiver with a smartcard, and/or similar identification that can be used to authenticate to set up account. Having determined that the endpoint media device 116 and/or the endpoint has potential to have an account, another layer may allow for search and authentication operations to try to find an account associated with the endpoint media device 116 and/or the endpoint and then authenticate against services related as part of a subscriber account.

Another layer may allow for filtering one or a combination of the content composite 180, the content item 176, the particularized content item 177, and/or the personalization content based at least in part on the authentication and identification of the endpoint viewer. For example, such filtering may include selecting and presenting the content composite 180, the content item 176, the particularized content item 177, and/or the personalization content that correspond to one or more demographics of the identified viewer (e.g., age, marital status, children, pets, renter, homeowner, etc.) and/or viewer type (e.g., flag indicia of NC-17, MA, or another rating so an endpoint device with parental specifications would be provided with appropriate content items). As another example, such filtering may include selecting and presenting the content composite 180, the content item 176, the particularized content item 177, and/or the personalization content that correspond to identified past actions mapped to the endpoint and/or endpoint media device 116. This can result in such differences as presenting content that is directed to, say, "purchase video subscription service X" versus "because you bought video subscription service X, . . . Y." Another layer may allow for creating a backchannel to facilitate communications, ordering, secure video delivery, and/or the like disclosed herein.

In some embodiments, the container flag 184 and/or containerization specifications 186 may prompt the endpoint media device 116 to execute the instructions to perform at least one operation of the set of one or more operations facilitated by the containerization object 182. In some embodiments, APIs may be used to instruct the endpoint media device 116 as to what to do with the container flag 184 and/or containerization specifications 186. In some embodiments, the container flag 184 and/or containerization specifications 186 may allow for invoking, waking up, opening, and/or otherwise activating an application of the endpoint media device 116 responsive to the decryption of the container flag 184 and/or containerization specifications 186, in some instances, when the application is offline and/or otherwise not online with respect to the system 102, 100, and/or another system 103.

For example, the container flag 184 and/or containerization specifications 186 may include a read flag that triggers one or more return channel communications. The corresponding instructions may instruct the endpoint media device 116 to report to the system 102, 100, and/or another system 103 with one or more return channel communications one or a combination of: that the content item 176 was received by the endpoint media device 116; that the content item 176 was presented with a display device at the endpoint media device 116; to what extent the content item 176 was presented (in full or to what lesser extent in percentage or another suitable metric); that the content item 176 was shown to an intended endpoint user, detection of one or more operations executed consequent to the presentation (e.g., scanning a matrix code, loading a coupon and/or particularization content into a mobile app such as a digital wallet of the endpoint media device 116, utilizing the particular content items 177 such as to order a product and/or service, etc.) and metrics of the operations (e.g., time of execution); and/or the like. Further, the return channel communications may include one or a combination of: indicia of a particular endpoint user and/or type of endpoint user using the endpoint media device 116 within a time period before and/or when at least part of a content item 176 is/was output for display; indicia of endpoint media device 116 capabilities (e.g., device specifications); indicia of authentication bases such as a SIM card of a mobile device, television receiver with a smartcard, and/or similar identification that can be used to authenticate to set up account; and/or the like.

The return channel communications may contribute to the observation data 229 and feedback loop features disclosed further herein. The containerization specifications 186 may instruct the endpoint media device 116 to report back upon occurrence of each state change and/or to report back per a reporting schedule (e.g., just prior to closure of an application, at end of day, at the end of another reporting period, etc.). In various embodiments, the container flag 184 and/or containerization specifications 186 may include one or more encrypted messages, hashes, and/or the like that each indicate one or more of the above reporting events. Accordingly, the instructions may specify that each return channel notification include a corresponding encrypted message, hash, code, and/or the like, which the system 102, 100, and/or another system 103 may process to verify the respective reporting event and metrics thereof.

In instances where the system 102 may receive pushed and/or pulled notifications from one or more service provider systems 103 that indicate when particularized content items 177 have been used by the endpoint devices 116 with respect to the systems 103 (e.g., to a system 103, uploading at least a portion of a content item 177; communicating at least a portion of a content item 177 such as code, accessing using a URL of a content item 177; transferring, presenting, or otherwise providing an image capture of a content item 177; and/or the like), the notifications may contain indicia of one or a combination of the content item 177, the endpoint device 116, the user associated with the endpoint device 116, a location associated with the use of the content item 177, date and/or time associated with the use of the content item 177, and/or the like. Having received such indicia from a service provider system 103, the subsystem 111 (e.g., the matching engine 238) may correlate the indicia to records stored in a database 222 with identifiers of one or a combination of the content item 177, the endpoint device 116, the user and/or account associated with the endpoint device 116, a location associated with the user, account, and/or endpoint device 116, and/or date and/or time associated with the delivery and/or presentation of the content item 177. The identified correlations may contribute to the observation data 229 and feedback loop features.

In some embodiments, where the content item 176 is not already adapted with the particularized content item 177, the set of one or more operations may include identifying the particularized content item 177 and adapting the content item 176 with the particularized content item 177. When the particularized content item 177 is not included in the content composite 180 when the content composite 180 is received by the endpoint media device 116, the set of one or more operations may include pulling the particularized content item 177 from the system 102, 100, another data source 103 per the containerization specifications 186. In some embodiments, the particularized content item(s) 177 may be transmitted separately from the system 102, 100 and/or another data source 103 prior to the delivery of the content composite 180 such that the endpoint media device 116 stores the particularized content item(s) 177 locally. In such instances, the set of one or more operations may include retrieving the matching particularized content item 177 from storage of the endpoint media device 116 per the containerization specifications 186. Further, in some embodiments, when the particularized content item 177 is not transmitted with the content item 176, the containerization specifications 186 may specify first checking local storage of the endpoint media device 116 for the matching particularized content item 177 and only pulling the particularized content item 177 from the system 102, 100 and/or another data source 103 when the particularized content item 177 is not available from the local storage.

Similarly, the set of one or more operations may include identifying the personalized content that is particular to one or more viewers and adapting the content item 176 with the personalized content. As disclosed herein, in some embodiments, the particularized content item 177 may include personalized content. In such instances, the adapting of the content item 176 with the particularized content item 177 may include adapting of the content item 176 with personalized content. Additionally or alternatively, personalized content may be separate from the particularized content item 177. Hence, where the content item 176 is not already adapted with the personalized content, the personalized content may be included in the content composite 180 when the content composite 180 is received by the endpoint media device 116. When the personalized content is not included in the content composite 180 when the content composite 180 is received by the endpoint media device 116, the set of one or more operations may include retrieving/pulling the personalized content from one or a combination of local storage of the endpoint media device 116, the system 102, 100, and/or another data source 103 per the containerization specifications 186. The containerization specifications 186 may specify first checking local storage of the endpoint media device 116 for the matching personalized content and then pulling the personalized content from the system 102, 100 and/or another data source 103 when at least some of the personalized content is not available (or when sufficient personalized content of one or more specified types is not available) from the local storage or when supplemental personalized content is identified as requested per the containerization specifications 186.

To facilitate the content composite 180, the composite build engine 240 may include a metadata handler 208 that may generate metadata (e.g., one or more tags) corresponding to identifiers, attributes, characteristics, and/or categories of programming content 202, adaptable content items 176, and/or particularized content items 177. In some embodiments, the composite build engine 240 may assign packet identifiers to identify data of the content that is to be transmitted as part of a data stream to an endpoint media device 116 and that is to be associated with one or more tags. Data transmitted as part of a data stream to an endpoint media device 116 may be packetized and assigned packet identifiers. A particular packet identifier may be associated with data packets related to tags for particular segments of programming content 202, adaptable content items 176, and/or particularized content items 177.

The content matching engine 238 may identify a televised event in the programming content 202 and may identify one or more corresponding identifiers, attributes, characteristics, and/or categories of programming content 202, adaptable content items 176, and/or particularized content items 177 of one or more adaptable content items 176 and/or one or more particularized content items 177. Based at least in part on such identification, the composite build engine 240 may create metadata, which, in some embodiments, may correspond to tag data.

Tag data may include an indication of a period of time (or other measure of time, e.g., a number of frames), a start frame, an end frame, and/or the like. Tag data may include or otherwise be associated with a tag identifier and may include event, attribute, characteristic, and/or category identifiers. For example, the metadata for the televised event may identify the particular event. The metadata may further identify one or more attributes of the particular event (e.g., any suitable identifier for the participating entities, the location of an event, and/or the like). In some embodiments, at least a portion of the metadata augmentation may be performed at the content provider system 102-1 such that one or more tagged composite components may be is provided to an endpoint media device 116. Subsequently, the endpoint media device 116 may identify composite components, for example, by processing the metadata.

The metadata for adaptable content items 176 may, for example, identify the adaptable content items 176 as being adaptable with any suitable identifier, such as a flag, field value, etc. Additionally or alternatively, the metadata for the adaptable content items 176 may identify that the adaptable content items 176 are designated for a certain event or category of events with any suitable identifier. The metadata for the adaptable content items 176 may further identify one or more attributes of the particular event (e.g., any suitable identifier for associated entities, location, a temporal attribute such as a time of an event, and/or the like). Additionally or alternatively, the metadata for the adaptable content items 176 may identify transition points, hooks, frames, windows, other portions designated for overlays, and/or the like for merging with content items 177 such that content from the content items 177 is merged at the transition points, hooks, frames, windows, other portions designated for overlays, and/or the like.

In some embodiments, metadata-augmented adaptable content items 176 may be provided by the service provider system 102-1 to the endpoint media devices 116, after which the endpoint media devices 116, each having at least a portion of the content composite subsystems 111, may process and use the metadata to facilitate matching adaptable content items 176 with corresponding programming content 202. Likewise, the endpoint media devices 116 may process and use the metadata to facilitate matching adaptable content items 176 with corresponding content items 177. Thus, the metadata may facilitate the endpoint media devices 116 appropriately providing corresponding content composites 180 for display with appropriate placement with respect to televised events, shows, etc. at commercial breaks and/or during presentation of the televised events, shows, etc. Further details relating to the subsystem 111 intelligently selecting and matching items 176, items 177, composites 180, and/or programming content 202 are disclosed in the applications incorporated by reference.

In some embodiments, with a system 103 identified based at least in part on identified the metadata and/or characteristics, the matching engine 238 may and perform a search of the repositories 222 for one or more content items 177 that have metadata that maps to provider systems 103. In such cases where the repositories 222 are searched for one or more content items 177, the one or more content items 177 may have been previously transmitted to the subsystem 111 directly from one or more service provider systems 103-1 or indirectly from one or more service provider systems 103-1 by way of the service provider system 102-1. Such content items 177 may include temporal identification indicating a time for which content corresponding to the content item 177 remains in effect. For example, each content item 177 may comprise content for which an expiration is specified (e.g., with one or more of time, date, duration, etc.). Accordingly, the matching engine 238 may perform a staleness check by examining the metadata of any such content items 177 retrieved from the repositories 222 to determine whether the content items 177 have expired with respect to the current time and date. Further details regarding the subsystem 111 are disclosed in the applications incorporated by reference.

As illustrated by FIG. 2, the content processing subsystem 111 may include a learning engine 239 that may be an analysis engine that employs machine learning. The learning engine 239 may further employ deep learning. Accordingly, the learning engine 239 may facilitate machine learning or, more specifically, deep learning, to facilitate creation, development, and/or use of viewer pattern data 216. As disclosed herein, the subsystem 111 may determine a program, show, etc. that the viewer actually is viewing, is about to view (e.g., the televised event is scheduled to play on the channel that the viewer is currently viewing), or is likely to view as determined with the learning engine 239. The subsystem 111 may push information indicating the televised event to one or more service provider systems 102-1 and/or 103-1. In some embodiments, the service provider system 102-1 may select one or more adaptable content items 176 matching the televised content segment for transfer to the subsystem 111 which, as disclosed herein, may be a part of the content provider system 102 and/or may be part of the receiver 116*e* and/or devices 116. The subsystem 111 may select from the one or more adaptable content items 176 as matching particular segments of the televised segment and, utilizing a content splicing engine 242 in some embodiments, may output one or more corresponding content composites 180 for display after the particular segments and/or simultaneously with the particular segments.

In various embodiments, one or more of the service provider systems 102-1, 103-1 may select one or more particularized content items 177 matching the televised event for transfer to the subsystem 111. In some embodiments, one or more of the service provider systems 102-1, 103-1 may select a set of one or more particularized content items 177 for transfer (e.g., based on recency of information updates corresponding to the content items 177) for transfer to the subsystem 111, and the subsystem 111 may determine which content items 177 from the set match the televised content segment. As disclosed above, the content composite subsystem 111 may include a matching engine 238 that may include logic to implement and/or otherwise facilitate any taxonomy, classification, categorization, correlation, mapping, qualification, scoring, organization, and/or the like features disclosed herein.

Figure 4A:
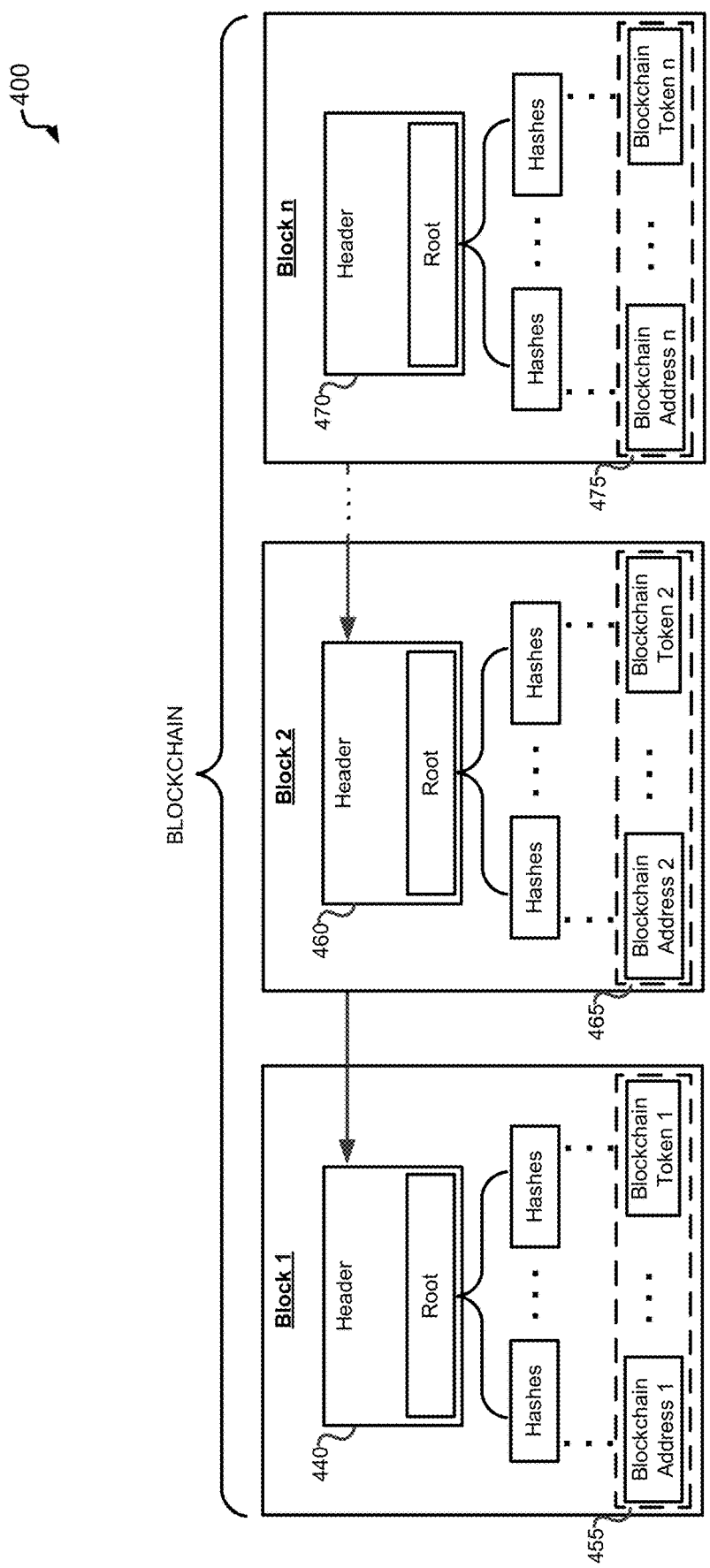
FIG. 4A illustrates certain aspects of one possible portion of a blockchain, in accordance with disclosed embodiments of the present disclosure.

FIG. 4A illustrates certain aspects of one possible portion of a blockchain 400, in accordance with various embodiments of the present disclosure. Disclosed embodiments may include the use of blockchain systems as mechanisms in conjunction with the content item and composite provisioning features disclosed herein. Various embodiments may use blockchain systems to facilitate recording, confirming, and verifying one or a combination of the interactions disclosed herein. Such interactions may include those recorded to form the observation data 229, interactions corresponding to when a modified or unmodified content item 176 was presented with a display device at an endpoint media device 116, when a particularized content item 177 was presented with a display device at an endpoint media device 116, to what extent the content items were was presented, one or more operations executed consequent to the presentation (e.g., scanning a matrix code, loading a coupon and/or another particularized content item 177 into mobile app such as a digital wallet of the endpoint media device 116, etc.), when particularized content items 177 have been used by the endpoint devices 116 with respect to the systems 103 (e.g., to a system 103, uploading at least a portion of a content item 177; communicating at least a portion of a content item 177 such as code, accessing using a URL of a content item 177; transferring, presenting, or otherwise providing an image capture of a content item 177; and/or the like), when a user of an endpoint device 116 otherwise makes a transaction with respect to the systems 103, and/or the like disclosed herein. Further, various embodiments may utilize data maintained in a blockchain in operations for provisioning content items 176, particularized content items 177, content composites 180, observation data 229, and biasing operations 181.

A blockchain may correspond to a distributed database that may be spread across a distributed computing system. The database may be used to maintain a ledger that may include a continuously growing list of records (i.e., blocks) in a publicly accessible manner. While a number of blocks are depicted for illustration, the blockchain 400 may include one or more blocks. Each block may include a respective header that may include header components, such as previous block hashes, merkle tree roots, timestamps, version numbers, and nonces. Headers 450, 460, and 470 are depicted in the non-limiting example blockchain 400. The blocks of the blockchain 400 may be linked by way of inter-block references. For example, cryptography may be employed so that each block may include a cryptographic hash of another block, a timestamp, and transaction data. A peer-to-peer network may manage a blockchain 400 according to a protocol for block validation, for example, when blocks are created and added to the blockchain 400. The data in an instantiated block may not be retroactively changed after it has been recorded without altering all subsequent blocks in the blockchain. Accordingly, the blockchain 400 may provide a verifiable and permanent record of the data.

The example blockchain 400 also depicts each block with blockchain data 455, 465, and 475. Such blockchain data may include, for example, blockchain addresses and blockchain tokens. In some instances, the blockchain addresses may correspond to the same blockchain address mapped to a single viewer.

In various embodiments, an endpoint media device 116 may provide for an interface with user-selectable options that may allow a viewer to input profile information which may include a blockchain address associated with the viewer, along with other profile information. In some embodiments, such information may be obtained with a digital wallet application of the endpoint media device 116, which may, in some embodiments, cause the endpoint media device 116 to automatically transmit the information to the subsystem 111. Such automatic transmission may be triggered by viewer interaction with content items 176, particularized content items 177, and/or content composites 180 in various embodiments. The digital wallet may store one or more blockchain addresses corresponding to blockchain accounts of blockchains 400 associated with the viewer. Likewise, the subsystem 111 may store one or more blockchain addresses corresponding to blockchain accounts of blockchains 400 associated with the viewer.

In some instances, the subsystem 111 may store mapping of a user's user profile information particulars with the user's blockchain address, which, in some embodiments, may be received pursuant to registration, setup, and/or the like of an account for services and/or the digital wallet of the endpoint media device 116. In various embodiments, the subsystem 111 may communicate with a blockchain node (e.g., blockchain computer 105) of a blockchain network (e.g., an Ethereum blockchain network), and/or may be configured to operate as a blockchain node (e.g., blockchain computer 105) of a blockchain network. For example, in some embodiments, one or more of the systems 103 may include or otherwise correspond to a blockchain node of the blockchain network.

The notifications triggered consequent to the viewer interactions disclosed herein may include transmissions to a blockchain computer 105 configured to create blockchain tokens corresponding to the transmissions and associated with the viewer's blockchain address. In various embodiments, such transmissions may be in addition or in alternative to the return channel notifications disclosed herein. In some embodiments, such transmissions may be transmitted by the system 102 consequent to the system 102 receiving the return channel notifications. Further, as disclosed herein, the viewer interactions may include transactions with respect to the service provider systems 103 such as the viewer's orders, purchases, and other interactions with service provider systems 103-1. Consequent to such transactions, in some instances, transmissions to the blockchain computer 105 may be transmitted by the service provider systems 103.

In some embodiments, such transmissions may be transmitted to the blockchain computer 105 by the endpoint media device 116. In some embodiments, the containerization specifications 186 may instruct the endpoint media device 116 to send such transmission upon occurrence of each interaction and/or per a reporting schedule (e.g., just prior to closure of an application, at end of day, at the end of another reporting period, etc.). For example, the container flag 184 and/or containerization specifications 186 may include a flag that triggers one or more transmissions to a blockchain computer 105. The corresponding instructions may instruct the endpoint media device 116 to report to the blockchain computer 105 with the transmissions one or a combination of: that the content item 176 was received by the endpoint media device 116; that the content item 176 was presented with a display device at the endpoint media device 116; to what extent the content item 176 was presented (in full or to what lesser extent in percentage or another suitable metric); that the content item 176 was shown to an intended endpoint user, detection of one or more operations executed consequent to the presentation (e.g., scanning a matrix code, loading a coupon and/or particularization content into a mobile app such as a digital wallet of the endpoint media device 116, utilizing the particular content items 177 such as to order a product and/or service, etc.) and metrics of the operations (e.g., time of execution); and/or the like.

The transmissions to the blockchain computer 105 may include the viewer's blockchain address and any suitable data related to generating a blockchain token. A blockchain token may include a digital asset maintained within a blockchain. A blockchain token may represent one or a combination of the interactions of the viewer with content items 176, particularized content items 177, and/or content composites 180, types of the viewer's orders, purchases, and other interactions with service provider systems 103-1, and/or the like. Blockchain tokens may conform to any suitable token specifications (e.g., those for ERC-20 tokens, ERC-721 token, or any suitable Ethereum tokens, and/or the like.). A blockchain token may include data corresponding to any one or a combination of the data items tracked and learned (e.g., to contributed to observation data 229) with respect to viewer interactions and transactions in accordance with the various embodiments disclosed herein.

The transmissions to the blockchain computer 105 may specify a type of blockchain token to be generated. For example, types of blockchain tokens may include a content interaction token and a transaction token that correspond to the viewer interactions and transactions. The transmissions to the blockchain computer 105 may include any suitable data such as one or a combination of the types data disclosed herein with respect to the return channel notifications, observation data 229, and/or the like to record the viewer interactions and transactions. In some embodiments, the transmissions to the blockchain computer 105 may include computer code to facilitate the creation of the tokens. For example, the data may include one or more encrypted messages, hashes, codes, and/or the like that each indicate one or more of the above reporting events.

In some embodiments, consequent to a token being created and associated with the blockchain 400 with the viewer's blockchain address, the blockchain computer 105 may transmit a notification of the token creation to the subsystem 111 that indicates the token creation and the association with the viewer's blockchain address. Such a notification may be pushed to the subsystem 111 upon token creation and consequent to the corresponding viewer interaction or transaction. Additionally or alternatively, the subsystem 111 may be configured to use the stored blockchain address of a particular viewer to query the blockchain computer 105 for one or more blockchain tokens mapped to the particular blockchain address of the particular viewer. However, in embodiments where the subsystem 111 operate as a blockchain node, the subsystem 111 may directly obtain the one or more blockchain tokens from the blockchain.

The subsystem 111 may process blockchain data to verify the respective reporting event and metrics thereof, and may use the blockchain data to contribute to the observation data 229 and feedback loop features disclosed further herein. The subsystem 111 may use the blockchain data to determine which conditions of the rules 218 are satisfied to adaptively control content composite creation, the delivery of such content, and interactions with such content. Based at least in part on obtained blockchain data corresponding to one or more blockchain tokens that are associated with the blockchain address mapped to a particular viewer, the subsystem 111 adapt content composite 180, content item 176, and/or content item 177 provisioning to the particular viewer. Again, such adaptation may include requesting, searching for, and/or selecting particular types of adaptable content items 176 and/or content items 177 for content composite 180 creation, adaptation, and provisioning. The subsystem 111 may use the blockchain data to perform biasing 181 operations in accordance with embodiments disclosed herein. As part of such processes, one or more blockchain tokens mapped to a particular blockchain address of a particular viewer may be pushed to or pulled by the subsystem 111.

As one possible example out of many, blockchain data from the one or more blockchain tokens may include particular details that indicate that the particular viewer recently purchased or ordered a vehicle along with any suitable details of the vehicle, the seller, the time/date of purchase or order, etc. The blockchain tokens may have been created and associated with the blockchain 400 with the viewer's blockchain address by the blockchain computer 105 responsive to one or more transmissions from a service provider system 103 associated with the transaction and/or the from the endpoint device 116 (in instances where the endpoint device 116 was used to make the transaction), or responsive to a decentralized oracle (a smart contract configured to retrieve the pertinent data from other data sources) maintained by the blockchain retrieving the data that indicates that the particular viewer recently purchased or ordered a vehicle along with any suitable details of the vehicle, the seller, the time/date of purchase or order, etc.

Based at least in part on such blockchain data, the biasing 181 of content items 176, items 177, and/or composites 180 by the subsystem 111 may include provisioning content items 176 and/or 177 directed to supplemental products/services, such as warranties, accessories, etc. In some embodiments, consequent to the transmission and/or reception of the content items 176 and/or 177, the subsystem 111 and/or the endpoint device 116 may send one or more transmissions to the blockchain computer 105 to specify creation of one or more content item blockchain tokens mapped to the viewer's blockchain address and recording transmission and/or reception of the provisioned content items 176 and/or 177, along with any suitable data particular to the provisioned content items 176 and/or 177. Further, consequent to any of the various viewer interactions with the provisioned content items 176 and/or 177, the endpoint device 116 may send one or more transmissions to the blockchain computer 105 to specify creation of one or more content interaction tokens and/or transaction tokens that correspond to the viewer interactions and transactions mapped to the viewer's blockchain address and the provisioned content items 176 and/or 177.

As another example, blockchain data from the one or more blockchain tokens may include particular details that indicate that the particular viewer recently selected a content item 176, content item 177, and/or composite 180 to obtain more information, to select a hyperlink in the item to access a site, and/or the like. Such blockchain data may, for example, include any suitable details of the item/composite (e.g., one or more item and/or composite identifiers, a type of selection, time/date of selection, a service provider system 103 to which the item/composite corresponds, etc.). Based at least in part on such blockchain data, the biasing 181 of content items 176, items 177, and/or composites 180 by the subsystem 111 may include provisioning content items 176 and/or 177 including a coupon, offer, discount, etc. associated with the item/composite selection. In some embodiments, consequent to such provisioning, the subsystem 111 and/or the endpoint device 116 may send one or more transmissions to the blockchain computer 105 to specify creation of one or more content item blockchain tokens mapped to the viewer's blockchain address and recording transmission and/or reception of the provisioned content items 176, items 177, and/or composites 180, along with any suitable data particular to the provisioned content items 176, items 177, and/or composites 180. Further, consequent to any of the various viewer interactions with the provisioned content items 176, items 177, and/or composites 180, the endpoint device 116 may send one or more transmissions to the blockchain computer 105 to specify creation of one or more content interaction tokens and/or transaction tokens that correspond to the viewer interactions and transactions mapped to the viewer's blockchain address and the provisioned content items 176, items 177, and/or composites 180.

Continuing that example, blockchain data from one or more additional blockchain tokens may include particular details that indicate that the particular viewer recently redeemed, accepted, or used the coupon, offer, discount, etc., along with any suitable corresponding details, such as one or more identifiers of the coupon, offer, discount, etc., one or more identifiers of the corresponding order, purchase, etc., time/date of transaction, type of transaction, amount involved, a service provider system 103 to which the transaction corresponds, and/or the like. Based at least in part on such blockchain data, the biasing 181 of content items 176, items 177, and/or composites 180 by the subsystem 111 may include provisioning content items 176 and/or 177 directed to a supplemental coupon, offer, or discount supplemental products/services and/or those of a same type, mapped to the same service provider system 103 and/or a different service provider system 103. Again, the blockchain 400 may then be updated based in like manner to that disclosed above.

As still another example, blockchain data from the one or more blockchain tokens may include personalization data automatically entered into the blockchain 400 consequent to user interaction with the user's digital wallet. Blockchain data from one or more blockchain tokens may include particular details that indicate, for example, purchased items and/or items that correspond to saved coupons in the digital wallet that could form a shopping list. Based at least in part on such blockchain data, the biasing 181 of content items 176, items 177, and/or composites 180 by the subsystem 111 may include provisioning composites 180 adapted to include a shopping list of one or more items associated with the purchased items and/or items corresponding to the digital wallet. Again, the blockchain 400 may then be updated based in like manner to that disclosed above.

Accordingly, in some embodiments, an instance of the blockchain 400 may correspond to one central blockchain that is accessible by entities corresponding the one or more service provider systems 102 and/or one or more service provider systems 103, such as all rights owners of display opportunities/slots that offer the possibility to display an advertisement (e.g., with content items 176, items 177, and/or composites 180) to an end user (e.g., person, device, and/or household) and advertisers that purchase display opportunities. With the accessibility of the blockchain 400, intermediaries between such entities are rendered unnecessary. Via the blockchain 400, all the entities may access aggregate numbers of times content items 176, items 177, and/or composites 180 were presented to a specific end user. Every time an advertisement was presented to an end user the display opportunity owner, this so called "view" is also put into the blockchain 400. For example, for 100 million TV viewers of a content item 176, item 177, and/or composite 180 at the same time, there may be 100 million transactions of views on the blockchain 400. Likewise, other types of reporting events, metrics, and observation data 229 disclosed herein may be accessible via the blockchain data of the blockchain 400. In view of such data, entities may take informed actions, such as stop buying or bidding through the blockchain 400 or bidding to provide a price until a time deadline and a monetary threshold is reached. Entities that are interested in bidding on the same display opportunity can analyze the blockchain 400, see other bids, and see the current status of number of times an advertisement was presented to the same end user.

FIG. 4B illustrates certain aspects of the artificial intelligence based subsystem data flow 401, in accordance with various embodiments of the present disclosure. The content processing subsystem 111 may be configured to gather observation data 229, which may be specific to one or more particular identified users and/or may be generally related to particular endpoint media devices 116. The observation data 229 may be gathered from one or more devices 116, aggregated, consolidated, and transformed into viewer pattern profiles that include personalized pattern data 216.

In embodiments where the learning engine 239 is included in an endpoint media device 116, the device 116 may be a self-observer that may additionally gather additional observation data 229. In various embodiments, the data from the one or more devices 116 may be retrieved and/or received by the content processing subsystem 111 via one or more data acquisition interfaces, which may include interfaces of the content processing subsystem 111, the one or more endpoint media devices 116, and/or the like—through network(s) 120 in various embodiments, through any suitable means for direct communication, and/or through any other suitable means of transferring data. According to various embodiments where the subsystem 111 is included in a service provider system 102-1, observation data 229 may be actively gathered and/or pulled from the one or more endpoint media devices 116.

As disclosed herein, in various embodiments, the one or more data acquisition interfaces may include one or more APIs that define protocols and routines for interfacing with the one or more endpoint media devices 116 and which may specify API calls to/from one or more endpoint media devices 116. In various embodiments, the APIs may include a plug-in to integrate with an application of one or more endpoint media devices 116. The API translation profiles may translate the protocols and routines of the data source component and/or system to integrate at least temporarily with the system and allow one-way communication to the system 102-1 and/or two-way communication with system 102-1 in various embodiments by way of API calls.

Some embodiments of the subsystem 111 may aggregate observation data 229 to derive device identification data 404, device operations 406, temporal data 408, and/or contextual data 410. The device identification data 404 may include any suitable data for identifying and tracking particular receivers 116e and devices 116; associated accounts, subscribers, and viewers, with user profile information such as user IDs, email addresses, phone numbers, other contact info; and/or the like disclosed herein. The device operations data 406 may include any suitable data for identifying and tracking device operations and interactions as those disclosed herein. The contextual data 410 may include metrics and patterns of viewer interactions/responses pursuant to provisioning of content composites 180 and service provider system 103-1 biasing 181. For example, viewer responses to content composites 180 provisioning may include indications of whether the viewer selected a user-selectable options provided with composites 180, the types of such selections, and/or types of consequent interactions with service provider systems 103-1. For example, the metrics and patterns may take into account whether the viewer opted out of content composites 180, whether the viewer selected links of composites 180 to interact with the platforms and sites of one or more service provider systems 103-1, whether the viewer selected options to redirect content composites 180 and/or notifications from service provider systems 103-1 to a secondary device 116, which options and/or service provider systems 103-1 the viewer selected, whether the viewer used coupons, QR codes, etc. and the types of the viewer's orders, purchases, and other interactions with service provider systems 103-1, and/or the like. The temporal data 408 may include metrics such as any information to facilitate detection, recognition, and differentiation of one or combination of temporal factors correlated or which the content processing subsystem 111 correlates to other observation data 229 such as device identification data 404, contextual data 410, and/or the like. For example, the temporal data 408 may include time of day information, time of week information, time of year information, holiday information, etc. when the viewer made selections, orders, purchases, redemptions of coupons, offers, promo codes, etc.; and/or the like.

The learning engine 239 may map one or a combination of the various extra-composite metrics of the observation data 229 to the metrics of the particular composites 180 provided to a particular viewer. Based at least in part on taking into account such observation data 229 as part of a feedback loop, the learning engine 239 may employ an ongoing learning mode to develop personalized pattern data 216 for particular viewers or content receivers/devices generally, and to confirm, correct, and/or refine determinations made for personalized pattern data 216 for particular viewers or content receivers/devices generally. The content processing subsystem 111 may be configured to employ machine learning to process the observation data 229 and the content items 180 and to derive and develop the personalized pattern data 216. The content processing subsystem 111 may be configured to employ deep learning to process the observation data 229 and the content items 180 and to derive and develop the personalized pattern data 216. The learning engine 239 may be configured to perform any one or combination of features directed to matching or otherwise correlating the observation data 229—such as the device identification data 404, the device operation identification data 406, the temporal data 408, the contextual data 410, descriptive information of the content items 180, and/or the like—with intra-content metrics of the content items 180. The learning engine 239 may include logic to implement and/or otherwise facilitate any taxonomy, classification, categorization, correlation, mapping, qualification, scoring, organization, and/or the like features disclosed herein. In some embodiments, the learning engine 239 may include the matching engine 238.

The learning engine 239 may include a reasoning module to make logical inferences from a set of the detected and differentiated data to infer one or more patterns of activity for particular viewers and/or receivers/devices generally. A pattern-based reasoner could be employed to use various statistical techniques in analyzing the data in order to infer personalized pattern data 216 from the observation data 229. A transitive reasoner may be employed to infer relationships from a set of relationships related to the observation data 229. In various embodiments, the system automatically establishes and develops the personalized pattern data 216. However, the personalized pattern data 216 may be set up and/or tailored by users. With various embodiments, the personalized pattern data 216 may be automatically established and developed by the system.

The feedback could be used for training the system to heuristically adapt conclusions, profiles, correlations, attributes, triggers, patterns, and/or the like to learn particular viewers and adapt content composite 180 provisioning to particular viewers, which may include requesting, searching for, and/or selecting particular types of adaptable content items 176 and/or content items 177 (e.g., which may be based at least in part on the metadata features disclosed herein) for content composite 180 creation. For example, the learning engine 239 may learn that a particular viewer tends to interact with content composites 180 that are directed to only certain types of products and/or services. Such interaction object type differentiation may be on the macro level, such as recognizing that a viewer tends to interact more with composites 180 directed to certain types of products, services, and/or offers and not other types of products, services, and/or offers. Additionally, the learning engine 239 may learn that a particular viewer tends to interact with particular content composites 180 and/or types only after the particular content composite 180 and/or type has been presented to the viewer X number of times. In some instances, the detection of a particular content item 176 having been presented to the viewer X number of times (e.g., an absolute threshold number of times and/or a relative threshold to presentations to other viewers such as a top percentile of presentations relative to other viewers) may trigger the subsystem 111 provisioning a related particularized content item 177 to the viewer. Accordingly, the subsystem 111 may bias content composites 180 provisioning toward the types of products and/or services that tend to elicit viewer interaction, and decrease composite 180 provisioning frequency or cease provisioning for other types.

Further, the learning engine 239 may learn that a particular viewer tends to interact with content composites 180 that are directed to only types of products, services, and/or offers within a particular category. Accordingly, the subsystem 111 may likewise bias content composites 180 provisioning toward such types of products, services, and/or offers and decrease or cease provisioning with respect to other types. Further, viewer interaction differentiation may be on the micro level, such as recognizing that a viewer tends to interact more with composites 180 directed to certain types of offers, coupons, promotions, etc. Accordingly, the subsystem 111 may likewise bias content composites 180 provisioning toward such types and decrease or cease provisioning with respect to other types.

Further, in situations where a pattern of more micro-level interactions detected for particular viewer, the subsystem 111 biasing 181 of composites 180 may include serial provisioning of composites 180 in a serial drill-down manner such that the first composites 180 provisioned may be directed to a more macro-level outcome and one or more composites 180 subsequently provisioned may be directed to more micro-level outcomes in accordance with the detected pattern. Thus, disclosed embodiments may provide for serial matching of composites 180 with respect to one another in order to provision the composites 180 with a trend that matches the detected pattern. As one possible example out of many, when viewer interaction with macro-level composite 180 directed to a macro-level product and/or service (e.g., a vehicle) results in a macro-level outcome by the viewer (e.g., an purchase, order, etc. of the vehicle), the biasing 181 may include ceasing provisioning of repeats and variations of the macro-level composite 180 to the viewer and may further include subsequently provisioning more micro-level content composites 180 directed to more micro-level outcomes (e.g., complementary products/services, such as warranties, accessories, etc.).

As part of such learning and adaptation processes, the subsystem 111 may bias composite 180 provisioning toward use of content items 177 from certain service provider systems 103-1 over other service provider systems 103-1. The learning engine 239 may perform correlation based at least in part on correlation rules that govern correlation of the personalized pattern data 216 to content items 177 and corresponding sources of the content items 177 based at least in part on metrics and availabilities of the content items 177 from the particular source systems 103-1. In various embodiments, the correlation may be based at least in part on the profiles of the service provider systems 103-1. In analyzing content items 177 received for particular service provider systems 103-1, the subsystem 111 may identify patterns of types of content items 177 and mapped which types of content items 177 are provided by which service provider systems 103-1. Based at least in part on such mapping, the subsystem 111 may prioritize use of content items 177 from particular service provider systems 103-1 where the content items 177 are of viewers directed to the types of interactions that match interaction patterns of a particular viewer.

Further, such biasing 181 of content items 177 from one or more systems 103-1 may include prioritizing attempts to pull content items 177 from one or more systems 103-1 based at least in part on speed and responsiveness of systems 103-1. The subsystem 111 may aggregate and develop service provider system metrics based at least in part on the speed and responsiveness of systems 103-1 demonstrated with previous attempts to pull one or more content items 177 within one or more historical time windows (e.g., previous day, five days, week, month, year, etc.). The service provider systems 103-1 may be scored based at least in part on the metrics, and an individual scores may be utilized in identifying preferential biasing 181 an attempt to pull content items 177 from respective systems 103-1. For example, the subsystem 111 may attempt to pull one or more content items 177 from a first set of one or more service provider systems 103-1 that has the highest score based on previous performance with respect to speed, timeliness, and a matching content items 177. In the case that no matching content items 177 are successfully pulled from the first set of one or more service provider system 103-1 within a time threshold after the initial request, then the subsystem 111 may pull one or more content items 177 from a second set of one or more service provider systems 103-1 that have lower scores. Such serial stages attempt to pull content items 177 may be continued with additional sets of lower scored systems 103-1. The time thresholds may be different for each stage (e.g., decreasing or increasing in time) and the size of the selected sets of service provider systems 103-1 may be different for each stage (e.g., decreasing or increasing in size). In cases where multiple such stages are necessary, the subsystem 111 may subsequently adjust metrics for the systems 103-1, taking into account the performance demonstrated with such stages of attempt to pull objects 177.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Further details regarding embodiments of receivers corresponding to receivers 116e and of computing devices 116 that make use of, interact with, and/or at least partially include the subsystem 111 are disclosed in the applications incorporated by reference herein. Likewise, further details regarding a computer system that may be incorporated as part of the previously described computerized devices, such as a television receiver 116e, device(s) 116, and/or content provider system 102-1 are disclosed in the applications incorporated by reference herein. Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques and features. Various changes may be made in the function and arrangement of elements without departing from the spirit or scope of the disclosure.

What is claimed:

1. A system to adapt content composites to device operations of an endpoint media device, the system comprising:
   one or more processing devices; and
   memory readable by the one or more processing devices and having stored therein processor-readable instructions which, when executed by the one or more processing devices, cause the one or more processing devices to perform operations comprising:
      identifying a first content composite for delivery via one or more networks to a first endpoint media device;
      causing sending of the first content composite, where, consequent to delivery of the first content composite to the first endpoint media device:
         the first endpoint media device or a second endpoint media device performs at least one operation relating to the first content composite, where the at least one operation corresponds to initiating an interactive process based at least in part on the first content composite after at least part of the first content composite is displayed, by a display device associated with the first endpoint media device or the second endpoint media device, and after a selection corresponding to the first content composite; and
         at least one device causes one or more subsequent communications to a blockchain computer to cause generation of a blockchain token based at least in part on triggering of the first content composite responsive to the at least one operation relating to the first content composite;
      processing blockchain data associated with the blockchain token;
      mapping one or both of the blockchain data and a blockchain address to the first endpoint media device;
      identifying a second content composite for delivery to the first endpoint media device, where the identifying the second content composite is based at least in part on the blockchain data; and
      causing sending of the second content composite to one or both of the first endpoint media device and the second endpoint media device.

2. The system to adapt content composites to device operations of an endpoint media device as recited in claim 1, where, consequent to delivery of the second content composite to the first endpoint media device, the first endpoint media device or the second endpoint media device performs at least one operation relating to the second content composite.

3. The system to adapt content composites to device operations of an endpoint media device as recited in claim 1, where the blockchain token is representative of an interaction with the first content composite.

4. The system to adapt content composites to device operations of an endpoint media device as recited in claim 1, the operations further comprising:
   generating the second content composite for delivery in a packet stream via the one or more networks, where:
   the second content composite comprises adaptable content corresponding to a set of one or more audio and/or video packets corresponding to audio and/or video content; and
   the generating comprises adapting the adaptable content with other content.

5. The system to adapt content composites to device operations of an endpoint media device as recited in claim 1, where the blockchain token is representative of an interaction with a remote system that is remote from the one or more processing devices, the first endpoint media device, and the second endpoint media device.

6. The system to adapt content composites to device operations of an endpoint media device as recited in claim 1, where the at least one device corresponds to the first endpoint media device, the second endpoint media device, the one or more processing devices, or a remote system that is remote from the one or more processing devices, the first endpoint media device, and the second endpoint media device.

7. The system to adapt content composites to device operations of an endpoint media device as recited in claim 1, where the blockchain computer corresponds to the first endpoint media device, the second endpoint media device, the one or more processing devices, or a remote system that is remote from the one or more processing devices, the first endpoint media device, and the second endpoint media device.

8. A method for adapting content composites to device operations of an endpoint media device, the method comprising:
   identifying, by one or more processing devices, a first content composite for delivery via one or more networks to a first endpoint media device;

causing sending of the first content composite, where, consequent to delivery of the first content composite to the first endpoint media device:

the first endpoint media device or a second endpoint media device performs at least one operation relating to the first content composite, where the at least one operation corresponds to initiating an interactive process based at least in part on the first content composite after at least part of the first content composite is displayed, by a display device associated with the first endpoint media device or the second endpoint media device, and after a selection corresponding to the first content composite; and at least one device causes one or more subsequent communications to a blockchain computer to cause generation of a blockchain token based at least in part on triggering of the first content composite responsive to the at least one operation relating to the first content composite;

processing, by the one or more processing devices, blockchain data associated with the blockchain token;

mapping, by the one or more processing devices, one or both of the blockchain data and a blockchain address to the first endpoint media device;

identifying, by the one or more processing devices, a second content composite for delivery to the first endpoint media device, where the identifying the second content composite is based at least in part on the blockchain data; and causing sending of the second content composite to one or both of the first endpoint media device and the second endpoint media device.

9. The method for adapting content composites to device operations of an endpoint media device as recited in claim 8, where, consequent to delivery of the second content composite to the first endpoint media device, the first endpoint media device or the second endpoint media device performs at least one operation relating to the second content composite.

10. The method for adapting content composites to device operations of an endpoint media device as recited in claim 8, where the blockchain token is representative of an interaction with the first content composite.

11. The method for adapting content composites to device operations of an endpoint media device as recited in claim 8, the method further comprising:

generating the second content composite for delivery in a packet stream via the one or more networks, where:

the second content composite comprises adaptable content corresponding to a set of one or more audio and/or video packets corresponding to 8 audio and/or video content; and the generating comprises adapting the adaptable content with other content.

12. The method for adapting content composites to device operations of an endpoint media device as recited in claim 8, where the blockchain token is representative of an interaction with a remote system that is remote from the one or more processing devices, the first endpoint media device, and the second endpoint media device.

13. The method for adapting content composites to device operations of an endpoint media device as recited in claim 8, where the at least one device corresponds to the first endpoint media device, the second endpoint media device, the one or more processing devices, or a remote system that is remote from the one or more processing devices, the first endpoint media device, and the second endpoint media device.

14. The method for adapting content composites to device operations of an endpoint media device as recited in claim 8, where the blockchain computer corresponds to the first endpoint media device, the second endpoint media device, the one or more processing devices, or a remote system that is remote from the one or more processing devices, the first endpoint media device, and the second endpoint media device.

15. One or more non-transitory, machine-readable media having machine-readable instructions thereon which, when executed by one or more processing devices, cause the one or more processing devices to perform operations comprising:

identifying a first content composite for delivery via one or more networks to a first endpoint media device;

causing sending of the first content composite, where, consequent to 7 delivery of the first content composite to the first endpoint media device:

the first endpoint media device or a second endpoint media device performs at least one operation relating to the first content composite, where the at least one operation corresponds to initiating an interactive process based at least in part on the first content composite after at least part of the first content composite is displayed, by a display device associated with the first endpoint media device or the second endpoint media device, and after a selection corresponding to the first content composite; and at least one device causes one or more subsequent communications to a blockchain computer to cause generation of a blockchain token based at least in part on triggering of the first content composite responsive to the at least one operation relating to the first content composite;

processing blockchain data associated with the blockchain token;

mapping one or both of the blockchain data and a blockchain address to the first endpoint media device;

identifying a second content composite for delivery to the first endpoint media device, where the identifying the second content composite is based at least in part on the blockchain data; and causing sending of the second content composite to one or both of the first endpoint media device and the second endpoint media device.

16. The one or more non-transitory, machine-readable media as recited in claim 15, where, consequent to delivery of the second content composite to the first endpoint media device, the first endpoint media device or the second endpoint media device performs at least one operation relating to the second content composite.

17. The one or more non-transitory, machine-readable media as recited in claim 15, where the blockchain token is representative of an interaction with the first content composite.

18. The one or more non-transitory, machine-readable media as recited in claim 15, the operations further comprising:

generating the second content composite for delivery in a packet stream via the one or more networks, where:

the second content composite comprises adaptable content corresponding to a set of one or more audio and/or video packets corresponding to audio and/or video content; and the generating comprises adapting the adaptable content with other content.

19. The one or more non-transitory, machine-readable media as recited in claim 15, where the blockchain token is representative of an interaction with a remote system that is remote from the one or more processing devices, the first endpoint media device, and the second endpoint media device.

20. The one or more non-transitory, machine-readable media as recited in claim 15, where the at least one device corresponds to the first endpoint media device, the second endpoint media device, the one or more processing devices, or a remote system that is remote from the one or more processing devices, the first endpoint media device, and the second endpoint media device.

* * * * *